(12) United States Patent
Brewer

(10) Patent No.: US 12,019,920 B2
(45) Date of Patent: *Jun. 25, 2024

(54) MEMORY CONTROLLER WITH PROGRAMMABLE ATOMIC OPERATIONS

(71) Applicant: Micron Technology, Inc., Boise, ID (US)

(72) Inventor: Tony M. Brewer, Plano, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/958,404

(22) Filed: Oct. 2, 2022

(65) Prior Publication Data

US 2023/0041362 A1    Feb. 9, 2023

Related U.S. Application Data

(63) Continuation of application No. 17/128,862, filed on Dec. 21, 2020, now Pat. No. 11,461,048, which is a
(Continued)

(51) Int. Cl.
*G06F 3/06* (2006.01)
*G06F 12/0875* (2016.01)

(52) U.S. Cl.
CPC .......... *G06F 3/0659* (2013.01); *G06F 3/0604* (2013.01); *G06F 3/0683* (2013.01); *G06F 12/0875* (2013.01); *G06F 2212/452* (2013.01)

(58) Field of Classification Search
CPC .... G06F 3/0659; G06F 3/0604; G06F 3/0683; G06F 9/3001; G06F 9/30029;
(Continued)

(56) References Cited

U.S. PATENT DOCUMENTS 5,621,694 A    4/1997   Sakugawa
2003/0172104 A1*  9/2003   Hooman ............... G06F 9/4881
                                                       718/103
(Continued)

FOREIGN PATENT DOCUMENTS

CN         104516831 A     4/2015

OTHER PUBLICATIONS

Notification of Transmittal of the International Preliminary Report on Patentability for International Application No. PCT/US2019/015467, dated Apr. 21, 2020, pp. 1-6.
(Continued)

*Primary Examiner* — Michael Krofcheck
(74) *Attorney, Agent, or Firm* — Nancy R. Gamburd; Gamburd Law Group LLC

(57) ABSTRACT

A memory controller circuit is disclosed which is coupleable to a first memory circuit, such as DRAM, and includes: a first memory control circuit to read from or write to the first memory circuit; a second memory circuit, such as SRAM; a second memory control circuit adapted to read from the second memory circuit in response to a read request when the requested data is stored in the second memory circuit, and otherwise to transfer the read request to the first memory control circuit; predetermined atomic operations circuitry; and programmable atomic operations circuitry adapted to perform at least one programmable atomic operation. The second memory control circuit also transfers a received programmable atomic operation request to the programmable atomic operations circuitry and sets a hazard bit for a cache line of the second memory circuit.

21 Claims, 18 Drawing Sheets

Related U.S. Application Data continuation of application No. 16/259,879, filed on Jan. 28, 2019, now Pat. No. 10,915,271.

(60) Provisional application No. 62/623,331, filed on Jan. 29, 2018.

(58) Field of Classification Search
CPC ............... G06F 9/3004; G06F 9/30043; G06F 9/30123; G06F 9/34; G06F 9/3816; G06F 9/4881; G06F 9/544; G06F 9/50; G06F 9/30076; G06F 9/3851; G06F 12/0875; G06F 12/0815; G06F 13/1689; G06F 2212/425; G06F 2212/1024; G06F 2212/1008
See application file for complete search history.

(56) References Cited

U.S. PATENT DOCUMENTS

| | | | |
|---|---|---|---|
| 2004/0003208 A1 | 1/2004 | Damron | |
| 2005/0135176 A1 | 6/2005 | Ramakrishnan et al. | |
| 2007/0005908 A1* | 1/2007 | Lakshmanamurthy | ...................... G06F 13/1663 711/146 |
| 2007/0124568 A1 | 5/2007 | Kra | |
| 2008/0002578 A1* | 1/2008 | Coffman | ................. H04L 69/10 370/389 |
| 2012/0137075 A1* | 5/2012 | Vorbach | .............. G06F 12/0815 711/E12.024 |
| 2012/0144120 A1 | 6/2012 | Serebrin | |
| 2013/0166855 A1 | 6/2013 | Batwara | |
| 2013/0223234 A1 | 8/2013 | Fuhs | |
| 2013/0275663 A1* | 10/2013 | Lin | ........................ G06F 9/3004 711/105 |
| 2015/0269065 A1* | 9/2015 | Bourd | ..................... G06F 9/526 711/155 |
| 2017/0153824 A1* | 6/2017 | Luan | ..................... G06F 13/161 |
| 2018/0004451 A1* | 1/2018 | Liu | ....................... G06F 3/0604 |

OTHER PUBLICATIONS

Notification of Transmittal of the International Search Report and Written Opinion of the International Searching Authority, or the Declaration from the International Bureau of WIPO for International Application No. PCT/US2019/015467, dated Apr. 8, 2019, pp. 1-13.

Notification of Transmittal of the International Preliminary Report on Patentability for International Application No. PCT/US2019/015463, dated Jun. 26, 2020, pp. 1-36.

* cited by examiner

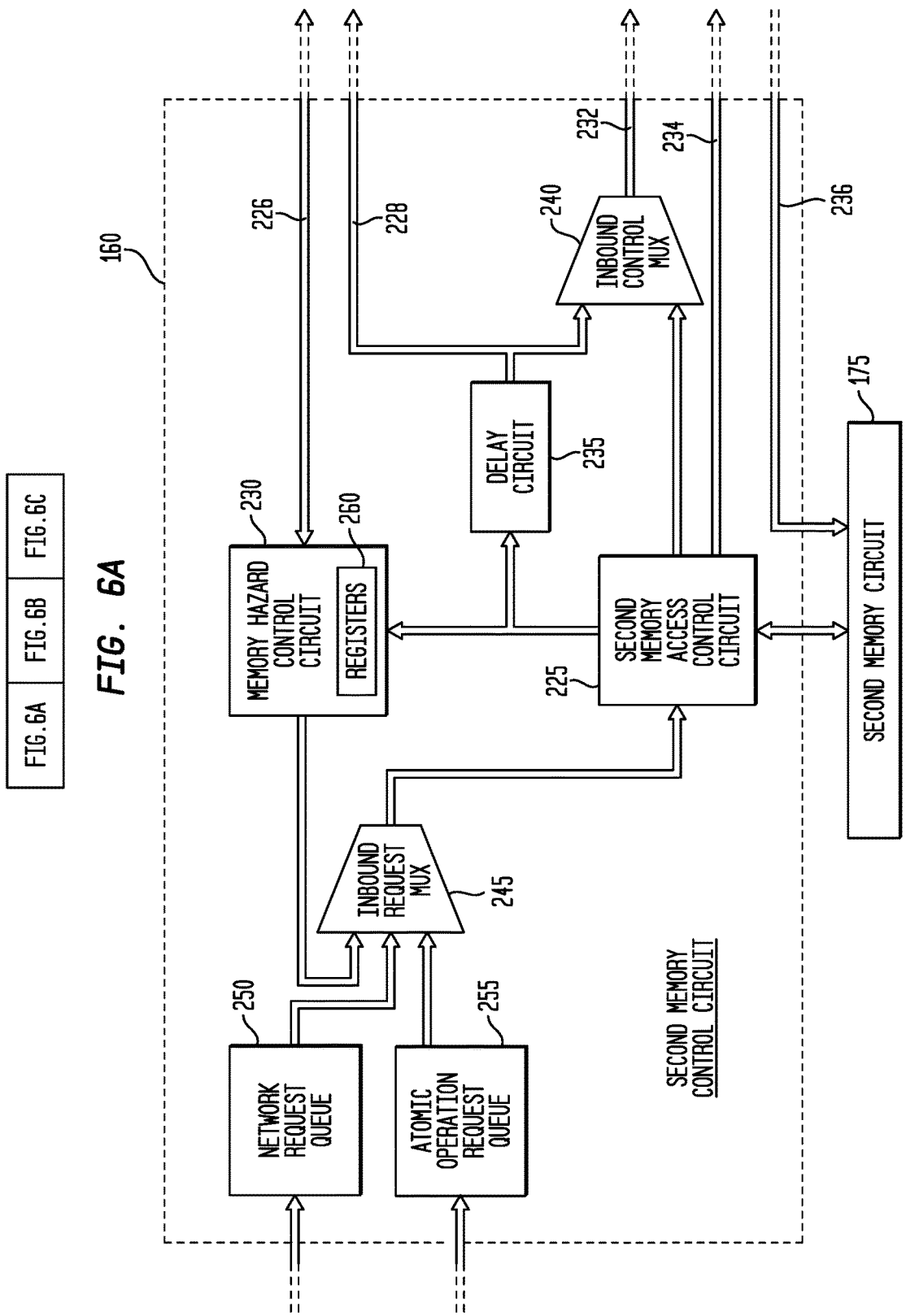

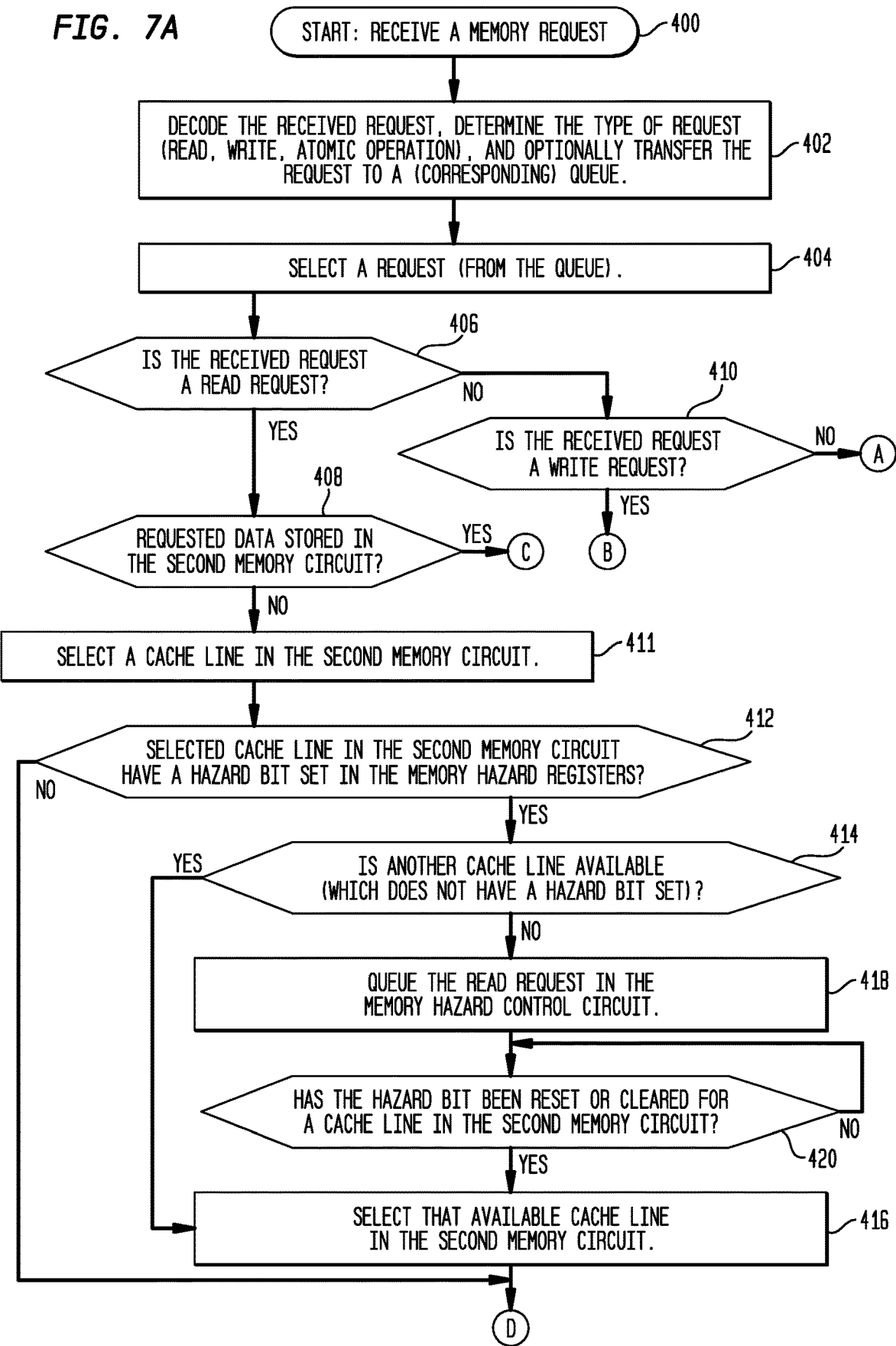

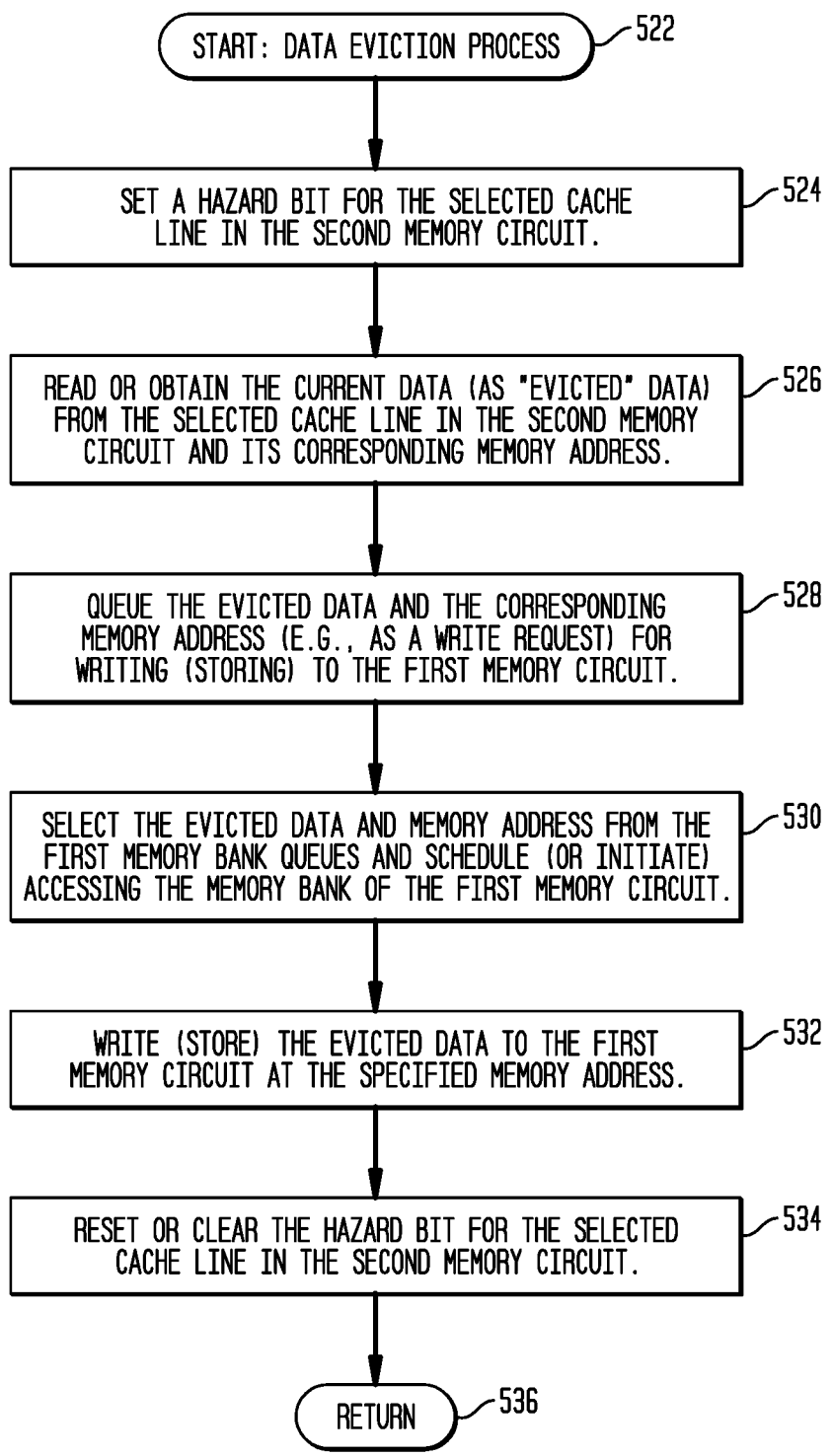

MEMORY CONTROLLER WITH PROGRAMMABLE ATOMIC OPERATIONS

CROSS-REFERENCE TO RELATED APPLICATIONS

This application is a continuation of and claims the benefit of and priority to U.S. patent application Ser. No. 17/128,862, filed Dec. 21, 2020, inventor Tony M. Brewer, titled "Memory Controller with Programmable Atomic Operations", which is a continuation of and claims the benefit of and priority to U.S. patent application Ser. No. 16/259,879, filed Jan. 28, 2019 and issued Feb. 9, 2021 as U.S. Pat. No. 10,915,271, inventor Tony M. Brewer, titled "Memory Controller with Programmable Atomic Operations", which is a nonprovisional of and claims the benefit of and priority to U.S. Provisional Patent Application No. 62/623,331, filed Jan. 29, 2018, inventor Tony M. Brewer, titled "Memory Controller with Integrated Custom Atomic Unit", which are commonly assigned herewith, and all of which are hereby incorporated herein by reference in their entireties with the same full force and effect as if set forth in their entireties herein.

STATEMENT REGARDING FEDERALLY SPONSORED RESEARCH OR DEVELOPMENT

This invention was made with government support under Agreement No. HR0011-16-3-0002 awarded by the Department of Defense (DOD-DARPA). The government has certain rights in this invention.

FIELD OF THE INVENTION

The present invention, in general, relates to memory controllers, and more particularly, relates to a memory controller which provides for both predetermined and programmable atomic operations and reduced latency for repetitively accessed memory locations.

BACKGROUND OF THE INVENTION

Memory controllers are ubiquitous in computing technologies, and among other things, memory controllers control access to read data from a memory circuit, to write data to a memory circuit, and to refresh the data held in the memory circuit. A wide variety of memory controllers are commercially available and a designed to be generally suitable for a wide range of applications, but are not optimized for particular applications, including machine learning and artificial intelligence ("AI") applications.

Accordingly, a need remains for a memory controller which has high performance and is energy efficient. Such a memory controller should provide support for compute intensive kernels or operations which require considerable and highly frequent memory accesses, e.g., applications which have performance that may be limited by how quickly the application can access data stored in memory, such as for performing Fast Fourier Transform ("FFT") operations, finite impulse response ("FIR") filtering, and other compute intensive operations typically used in larger applications such as synthetic aperture radar (e.g., requiring frequent access to tables stored in memory), 5G networking and 5G base station operations, machine learning, AI, stencil code operations, and graph analytic operations such as graph clustering using spectral techniques, for example and without limitation. Such a memory controller should also be optimized for high throughput and low latency, including high throughput and low latency for atomic operations. Such a memory controller should also provide for a wide range of atomic operations, including both predetermined atomic operations and also programmable or user-defined atomic operations.

SUMMARY OF THE INVENTION

As discussed in greater detail below, the representative apparatus, system and method provide for a memory controller which has high performance and is energy efficient. Representative embodiments of the memory controller provide support for compute intensive kernels or operations which require considerable and highly frequent memory accesses, such as for performing Fast Fourier Transform ("FFT") operations, finite impulse response ("FIR") filtering, and other compute intensive operations typically used in larger applications such as synthetic aperture radar, 5G networking and 5G base station operations, machine learning, AI, stencil code operations, and graph analytic operations such as graph clustering using spectral techniques, for example and without limitation. Representative embodiments of the memory controller are optimized for high throughput and low latency, including high throughput and low latency for atomic operations. Representative embodiments of the memory controller also provide for a wide range of atomic operations, including both predetermined atomic operations and also programmable or user-defined atomic operations.

When evaluated using an architectural simulator, representative embodiments of the memory controller produced dramatic results. For example, representative embodiments of the memory controller provided over a three-fold (3.48×) better atomic update performance using a standard GDDR6 DRAM memory compared to a state-of-the-art X86 server platform. Also for example, representative embodiments of the memory controller provided a seventeen-fold (17.6×) better atomic update performance using a modified GDDR6 DRAM memory (having more memory banks), also compared to a state-of-the-art X86 server platform.

The representative embodiments of the memory controller also provided for very low latency and high throughput memory read and write operations, generally only limited by the memory bank availability, error correction overhead, and the bandwidth (Gb/s) available over communication networks and the memory and cache devices themselves, resulting in a flat latency until maximum bandwidth is achieved.

Representative embodiments of the memory controller also provide very high performance (high throughput and low latency) for programmable or user-defined atomic operations, comparable to the performance of predetermined atomic operations. Rather than executing multiple memory accesses, in response to an atomic operation request designating a programmable atomic operation and a memory address, circuitry in the memory controller transfers the atomic operation request to programmable atomic operations circuitry and sets a hazard bit stored in a memory hazard register corresponding to the memory address of the memory line used in the atomic operation, to ensure that no other operation (read, write, or atomic) is performed on that memory line, which hazard bit is then cleared upon completion of the atomic operation. Additional, direct data paths provided for the programmable atomic operations circuitry 135 executing the programmable or user-defined atomic operations allow for additional write operations without any limitations imposed by the bandwidth of the communication networks and without increasing any congestion of the communication networks.

In a representative embodiment, a memory controller circuit is coupleable to a first memory circuit, with the memory controller comprising: a first memory control circuit coupleable to the first memory circuit, the first memory control circuit adapted to read or load requested data from the first memory circuit in response to a read request and to write or store requested data to the first memory circuit in response to a write request; a second memory circuit; a second memory control circuit coupled to the second memory circuit, the second memory control circuit adapted to read or load the requested data from the second memory circuit in response to a read request when the requested data is stored in the second memory circuit, and to transfer the read request to the first memory control circuit when the requested data is not stored in the second memory circuit; predetermined atomic operations circuitry adapted to perform at least one predetermined atomic operation of a plurality of predetermined atomic operations in response to an atomic operation request designating the at least one predetermined atomic operation; and programmable atomic operations circuitry adapted to perform at least one programmable atomic operation of a plurality of programmable atomic operations in response to an atomic operation request designating the at least one programmable atomic operation.

In another representative embodiment, a memory controller circuit is coupleable to a first memory circuit, with the memory controller comprising: a first memory control circuit coupleable to the first memory circuit, the first memory control circuit adapted to read or load requested data from the first memory circuit in response to a read request and to write or store requested data to the first memory circuit in response to a write request; programmable atomic operations circuitry coupled to the first memory control circuit, the programmable atomic operations circuitry adapted to perform at least one programmable atomic operation of a plurality of programmable atomic operations in response to an atomic operation request designating the at least one programmable atomic operation; a second memory circuit; and a second memory control circuit coupled to the second memory circuit and to the first memory control circuit, the second memory control circuit adapted, in response to an atomic operation request designating the at least one programmable atomic operation and a memory address, to transfer the atomic operation request to the programmable atomic operations circuitry and to set a hazard bit stored in a memory hazard register corresponding to the memory address.

In a representative embodiment, the plurality of predetermined atomic operations may comprise at least two predetermined atomic operations selected from the group consisting of: Fetch-and-AND, Fetch-and-OR, Fetch-and-XOR, Fetch-and-Add, Fetch-and-Subtract, Fetch-and-Increment, Fetch-and-Decrement, Fetch-and-Minimum, Fetch-and-Maximum, Fetch-and-Swap, Compare-and-Swap, and combinations thereof.

In a representative embodiment, the programmable atomic operations circuitry may comprise: an instruction cache storing a plurality of processor instructions corresponding to the at least one programmable atomic operation; an execution queue storing a thread identifier corresponding to the programmable atomic operation; a core control circuit coupled to the instruction cache and to the execution queue, the core control circuit adapted, in response to the thread identifier corresponding to the programmable atomic operation, to select a starting or next instruction or instruction address in the instruction cache for execution of the programmable atomic operation; and a processor core adapted to execute at least one instruction for the programmable atomic operation and to generate resulting data.

Also in a representative embodiment, the programmable atomic operations circuitry may further comprise: a memory controller interface circuit coupled to the processor core to receive the resulting data and to transfer the resulting data to the second memory control circuit to write the resulting data to the second memory circuit. In a representative embodiment, the memory controller circuit may further comprise: a network communication interface coupleable to a communication network and coupled to the memory controller interface circuit, the network communication interface adapted to prepare and transmit a response data packet having the resulting data on the communication network.

In a representative embodiment, the programmable atomic operations circuitry may further comprise: at least one data buffer to store operand data and interim results generated from executing the at least one instruction for the programmable atomic operation. Also in a representative embodiment, the programmable atomic operations circuitry may further comprise: a network command queue coupled to the processor core, the network command queue storing resulting data; and a network communication interface coupled to the network command queue and coupleable to a communication network, the network communication interface adapted to prepare and transmit a response data packet having the resulting data on the communication network.

In a representative embodiment, the processor core may be coupled to a data buffer, and the processor core may be further adapted to execute a load non-buffered instruction to determine if an operand is stored in the data buffer and, when the data is not stored in the data buffer, to generate a read request to the second memory control circuit.

In a representative embodiment, the processor core may be further adapted to execute a store and clear lock instruction to generate an atomic write request to the second memory control circuit, the atomic write request having the resulting data and a designation to reset or clear a memory hazard bit following writing of the resulting data to the second memory circuit. In a representative embodiment, the processor core may be further adapted to execute an atomic return instruction to reset or clear a memory hazard bit following writing of the resulting data to the second memory circuit. In a representative embodiment, the processor core may be further adapted to execute an atomic return instruction to generate a response data packet having the resulting data. In a representative embodiment, the processor core may be further adapted to execute an atomic return instruction to complete an atomic operation.

In a representative embodiment, the atomic operation request designating the at least one programmable atomic operation comprises a physical memory address, a programmable atomic operations identifier, and at least one thread state register value. In a representative embodiment, the programmable atomic operations circuitry may further comprise at least one register storing thread state information. In such a representative embodiment, the programmable atomic operations circuitry may be further adapted, in response to receiving the atomic operation request designating the at least one programmable atomic operation, to initialize the at least one register with the physical memory address, any data corresponding to the memory address, and the at least one thread state register value.

In a representative embodiment, the memory controller circuit may further comprise a network communication interface coupleable to a communication network and coupled to the first memory control circuit and to the second memory control circuit, the network communication interface adapted to decode a plurality of request packets received from the communication network, and to prepare and transmit a plurality of response data packets on the communication network.

In a representative embodiment, the programmable atomic operations circuitry is adapted to perform user-defined atomic operations, multi-cycle operations, floating point operations, and multi-instruction operations.

In a representative embodiment, the memory controller circuit may further comprise a write merge circuit adapted to write or store data read from the first memory circuit to the second memory circuit.

In a representative embodiment, the second memory control circuit is further adapted to read or load the requested data from the second memory circuit in response to an atomic operation request when the requested data is stored in the second memory circuit, and to transfer the atomic operation request to the first memory control circuit when the requested data is not stored in the second memory circuit. In a representative embodiment, the second memory control circuit is further adapted to write or store data to the second memory circuit in response to a write request or in response to an atomic operation request. In a representative embodiment, the second memory control circuit is further adapted, in response to a write request designating a memory address in the second memory circuit, to set a hazard bit stored in a memory hazard register corresponding to the memory address and, following writing or storing data to the second memory circuit at the memory address, to reset or clear the set hazard bit. In a representative embodiment, the second memory control circuit is further adapted, in response to a write request having write data and designating a memory address in the second memory circuit, to transfer current data stored at the memory address to the first memory control circuit to write the current data to the first memory circuit, and to overwrite the current data in the second memory circuit with the write data.

In a representative embodiment, the second memory control circuit is further adapted, in response to a write request having write data and designating a memory address in the second memory circuit, to set a hazard bit stored in a memory hazard register corresponding to the memory address, to transfer current data stored at the memory address to the first memory control circuit to write the current data to the first memory circuit, to overwrite the current data in the second memory circuit with the write data and, following writing or storing the write data to the second memory circuit at the memory address, to reset or clear the set hazard bit.

In a representative embodiment, the second memory control circuit is further adapted, in response to an atomic operation request designating the at least one programmable atomic operation and a memory address, to transfer the atomic operation request to the programmable atomic operations circuitry and to set a hazard bit stored in a memory hazard register corresponding to the memory address. In a representative embodiment, the second memory control circuit is further adapted, in response to an atomic operation request designating the at least one predetermined atomic operation and a memory address, to transfer the atomic operation request to the predetermined atomic operations circuitry, to set a hazard bit stored in a memory hazard register corresponding to the memory address, to write resulting data from the predetermined atomic operation in the second memory circuit and, following writing of the resulting data, to reset or clear the set hazard bit.

In a representative embodiment, the first memory control circuit may comprise: a plurality of memory bank request queues storing a plurality of read or write requests to the first memory circuit; a scheduler circuit coupled to the plurality of memory bank request queues, the scheduler adapted to select a read or write request of the plurality of read or write requests from the plurality of memory bank request queues and to schedule the read or write request for access to the first memory circuit; and a first memory access control circuit coupled to the scheduler, the first memory access control circuit adapted to read or load data from the first memory circuit and to write or store data to the first memory circuit.

In a representative embodiment, the first memory control circuit may further comprise: a plurality of memory request queues storing a plurality of memory requests; a request selection multiplexer to select a memory request from the plurality of memory request queues; a plurality of memory data queues storing data corresponding to the plurality of memory requests; and a data selection multiplexer to select data from the plurality of memory data queues, the selected data corresponding to the selected memory request.

In a representative embodiment, the second memory control circuit may comprise: a network request queue storing a read request or a write request; an atomic operation request queue storing an atomic operation request; an inbound request multiplexer couple to the network request queue and to the atomic operation request queue to select a request from the network request queue or the atomic operation request queue; a memory hazard control circuit having one or more memory hazard registers; and a second memory access control circuit coupled to the memory hazard control circuit and to the inbound request multiplexer, the second memory access control circuit adapted to read or load data from the second memory circuit or to write or store data to the second memory circuit in response to the selected request, and to signal the memory hazard control circuit to set or clear a hazard bit stored in the one or more memory hazard registers. In a representative embodiment, the second memory control circuit may further comprise: a delay circuit coupled to the second memory access control circuit; and an inbound control multiplexer to select an inbound network request which requires accessing the first memory circuit or to select a cache eviction request from the second memory circuit when a cache line of the second memory circuit contains data which is to be written to the first memory circuit prior to being overwritten by data from a read request or a write request.

In a representative embodiment, the memory controller circuit may be coupled to a communication network for routing of a plurality of write data request packets, a plurality of read data request packets, a plurality of predetermined atomic operations request packets, a plurality of programmable atomic operation request packets to the memory controller circuit, and routing of a plurality of response data packets from the memory controller circuit to a request source address.

In a representative embodiment, the programmable atomic operations circuitry may comprise: a processor circuit coupled to the first memory control circuit through an unswitched, direct communication bus.

In a representative embodiment, the first memory control circuit, the second memory circuit, the second memory control circuit, the predetermined atomic operations circuitry, and the programmable atomic operations circuitry may be embodied as a single integrated circuit or as a single system-on-a-chip (SOC).

In a representative embodiment, the first memory control circuit, the second memory circuit, the second memory control circuit, and the predetermined atomic operations circuitry may be embodied as a first integrated circuit, and the programmable atomic operations circuitry may be embodied as a second integrated circuit coupled through an unswitched, direct communication bus to the first integrated circuit.

In a representative embodiment, the programmable atomic operations circuitry is adapted to generate a read request and generate a write request to the second memory circuit. In a representative embodiment, the programmable atomic operations circuitry is adapted to perform arithmetic operations, logic operations, and control flow decisions.

In a representative embodiment, the first memory circuit comprises dynamic random access memory (DRAM) circuitry and the second memory circuit comprises static random access memory (SRAM) circuitry.

A representative method of using a memory controller circuit to perform a programmable atomic operation is also disclosed, with the memory controller circuit coupleable to a first memory circuit, with the method comprising: using a first memory control circuit coupleable to the first memory circuit, reading or loading requested data from the first memory circuit in response to a read request and writing or storing requested data to the first memory circuit in response to a write request; using a second memory control circuit coupled to a second memory circuit, reading or loading the requested data from the second memory circuit in response to a read request when the requested data is stored in the second memory circuit, and transferring the read request to the first memory control circuit when the requested data is not stored in the second memory circuit; using predetermined atomic operations circuitry, performing at least one predetermined atomic operation of a plurality of predetermined atomic operations in response to an atomic operation request designating the at least one predetermined atomic operation; and using programmable atomic operations circuitry, performing at least one programmable atomic operation of a plurality of programmable atomic operations in response to an atomic operation request designating the at least one programmable atomic operation.

Another representative method of using a memory controller circuit to perform a programmable atomic operation is also disclosed, with the memory controller circuit coupleable to a first memory circuit, with the method comprising: using a first memory control circuit coupleable to the first memory circuit, reading or loading requested data from the first memory circuit in response to a read request and writing or storing requested data to the first memory circuit in response to a write request; using a second memory control circuit coupled to a second memory circuit, reading or loading the requested data from the second memory circuit in response to a read request when the requested data is stored in the second memory circuit, and transferring the read request to the first memory control circuit when the requested data is not stored in the second memory circuit, and in response to an atomic operation request designating the at least one programmable atomic operation and a memory address, transferring the atomic operation request to programmable atomic operations circuitry and setting a hazard bit stored in a memory hazard register corresponding to the memory address; using predetermined atomic operations circuitry, performing at least one predetermined atomic operation of a plurality of predetermined atomic operations in response to an atomic operation request designating the at least one predetermined atomic operation; and using the programmable atomic operations circuitry, performing at least one programmable atomic operation of a plurality of programmable atomic operations in response to an atomic operation request designating the at least one programmable atomic operation.

In a representative embodiment, the programmable atomic operations circuitry comprises a processor core coupled to a data buffer, wherein the method may further comprise: using the processor core, executing a load non-buffered instruction to determine if an operand is stored in the data buffer and, when the data is not stored in the data buffer, generating a read request to the second memory control circuit.

In a representative embodiment, the programmable atomic operations circuitry comprises a processor core, and wherein the method may further comprise: using the processor core, executing a store and clear lock instruction to generate an atomic write request to the second memory control circuit, the atomic write request having the resulting data and a designation to reset or clear a memory hazard bit following writing of the resulting data to the second memory circuit. In a representative embodiment, the programmable atomic operations circuitry comprises a processor core, wherein the method may further comprise: using the processor core, executing an atomic return instruction to reset or clear a memory hazard bit following writing of the resulting data to the second memory circuit. In a representative embodiment, the programmable atomic operations circuitry comprises a processor core, and wherein the method may further comprise: using the processor core, executing an atomic return instruction to generate a response data packet having the resulting data. Also in a representative embodiment, the programmable atomic operations circuitry comprises a processor core, and wherein the method may further comprise: using the processor core, executing an atomic return instruction to complete an atomic operation.

In a representative embodiment, the atomic operation request designating the at least one programmable atomic operation comprises a physical memory address, a programmable atomic operations identifier, and at least one thread state register value. In such a representative embodiment, the programmable atomic operations circuitry further comprises at least one register storing thread state information, and wherein the method may further comprise: using the programmable atomic operations circuitry, in response to receiving the atomic operation request designating the at least one programmable atomic operation, initializing the at least one register with the physical memory address, any data corresponding to the memory address, and the at least one thread state register value.

In a representative embodiment, the method may further comprise: using the second memory control circuit, reading or loading the requested data from the second memory circuit in response to an atomic operation request when the requested data is stored in the second memory circuit, and transferring the atomic operation request to the first memory control circuit when the requested data is not stored in the second memory circuit. In a representative embodiment, the method may further comprise: using the second memory control circuit, in response to a write request designating a memory address in the second memory circuit, setting a hazard bit stored in a memory hazard register corresponding to the memory address and, following writing or storing data to the second memory circuit at the memory address, resetting or clearing the set hazard bit.

In a representative embodiment, the method may further comprise: using the second memory control circuit, in response to a write request having write data and designating a memory address in the second memory circuit, transferring current data stored at the memory address to the first memory control circuit to write the current data to the first memory circuit, and overwriting the current data in the second memory circuit with the write data. In a representative embodiment, the method may further comprise: using the second memory control circuit, in response to a write request having write data and designating a memory address in the second memory circuit, setting a hazard bit stored in a memory hazard register corresponding to the memory address, transferring current data stored at the memory address to the first memory control circuit to write the current data to the first memory circuit, overwriting the current data in the second memory circuit with the write data and, following writing or storing the write data to the second memory circuit at the memory address, resetting or clearing the set hazard bit.

In a representative embodiment, the method may further comprise: using the second memory control circuit, in response to an atomic operation request designating the at least one programmable atomic operation and a memory address, transferring the atomic operation request to the programmable atomic operations circuitry and setting a hazard bit stored in a memory hazard register corresponding to the memory address.

Another memory controller is disclosed, the memory controller coupleable to a first memory circuit, with the memory controller comprising: a first memory control circuit coupleable to the first memory circuit, the first memory control circuit comprising: a plurality of memory bank request queues storing a plurality of read or write requests to the first memory circuit; a scheduler circuit coupled to the plurality of memory bank request queues, the scheduler adapted to select a read or write request of the plurality of read or write requests from the plurality of memory bank request queues and to schedule the read or write request for access to the first memory circuit; and a first memory access control circuit coupled to the scheduler, the first memory access control circuit adapted to read or load data from the first memory circuit and to write or store data to the first memory circuit; a second memory circuit; predetermined atomic operations circuitry adapted to perform at least one predetermined atomic operation of a plurality of predetermined atomic operations; and programmable atomic operations circuitry adapted to perform at least one programmable atomic operation of a plurality of programmable atomic operations; and a second memory control circuit coupled to the second memory circuit, the second memory control circuit comprising: at least one input request queue storing a read or write request; a memory hazard control circuit having memory hazard registers; and a second memory access control circuit adapted to read or load data from the second memory circuit and to write or store data to the second memory circuit, the second memory access control circuit further adapted, in response to an atomic operation request designating the at least one predetermined atomic operation and a memory address, to transfer the atomic operation request to the predetermined atomic operations circuitry and to set a hazard bit stored in a memory hazard register corresponding to the memory address.

Another memory controller is disclosed, the memory controller coupleable to a first memory circuit, with the memory controller comprising: a first memory control circuit coupleable to the first memory circuit, the first memory control circuit comprising: a plurality of memory bank request queues storing a plurality of read or write requests to the first memory circuit; a scheduler circuit coupled to the plurality of memory bank request queues, the scheduler adapted to select a read or write request of the plurality of read or write requests from the plurality of memory bank request queues and to schedule the read or write request for access to the first memory circuit; and a first memory access control circuit coupled to the scheduler, the first memory access control circuit adapted to read or load data from the first memory circuit and to write or store data to the first memory circuit; a second memory circuit; predetermined atomic operations circuitry adapted to perform at least one predetermined atomic operation of a plurality of predetermined atomic operations; and programmable atomic operations circuitry adapted to perform at least one programmable atomic operation of a plurality of programmable atomic operations; and a second memory control circuit coupled to the second memory circuit, the second memory control circuit comprising: at least one input request queue storing a read or write request; a memory hazard control circuit having memory hazard registers; and a second memory access control circuit adapted to read or load data from the second memory circuit and to write or store data to the second memory circuit, the second memory access control circuit further adapted, in response to an atomic operation request designating the at least one predetermined atomic operation and a memory address, to transfer the atomic operation request to the predetermined atomic operations circuitry, to set a hazard bit stored in a memory hazard register corresponding to the memory address, to write resulting data from the predetermined atomic operation in the second memory circuit and, following writing of the resulting data, to reset or clear the set hazard bit.

Numerous other advantages and features of the present invention will become readily apparent from the following detailed description of the invention and the embodiments thereof, from the claims and from the accompanying drawings.

BRIEF DESCRIPTION OF THE DRAWINGS

The objects, features and advantages of the present invention will be more readily appreciated upon reference to the following disclosure when considered in conjunction with the accompanying drawings, wherein like reference numerals are used to identify identical components in the various views, and wherein reference numerals with alphabetic characters are utilized to identify additional types, instantiations or variations of a selected component embodiment in the various views, in which:

FIGS. 7A, 7B and 7C (collectively referred to as FIG. 7) are flow charts of a representative method of receiving and decoding of a request and performing a read or load request, with FIGS. 7A and 7B showing a representative method of receiving and decoding of a request and of performing a read or load request from a first memory circuit, and FIG. 7C showing a representative method of performing a read or load request from a second memory circuit.

FIG. 9 is a flow chart showing a representative method of performing a data eviction from the second memory circuit as part of a read (or load) request or as part of a write (or store) request.

DETAILED DESCRIPTION OF REPRESENTATIVE EMBODIMENTS

Figure 1:
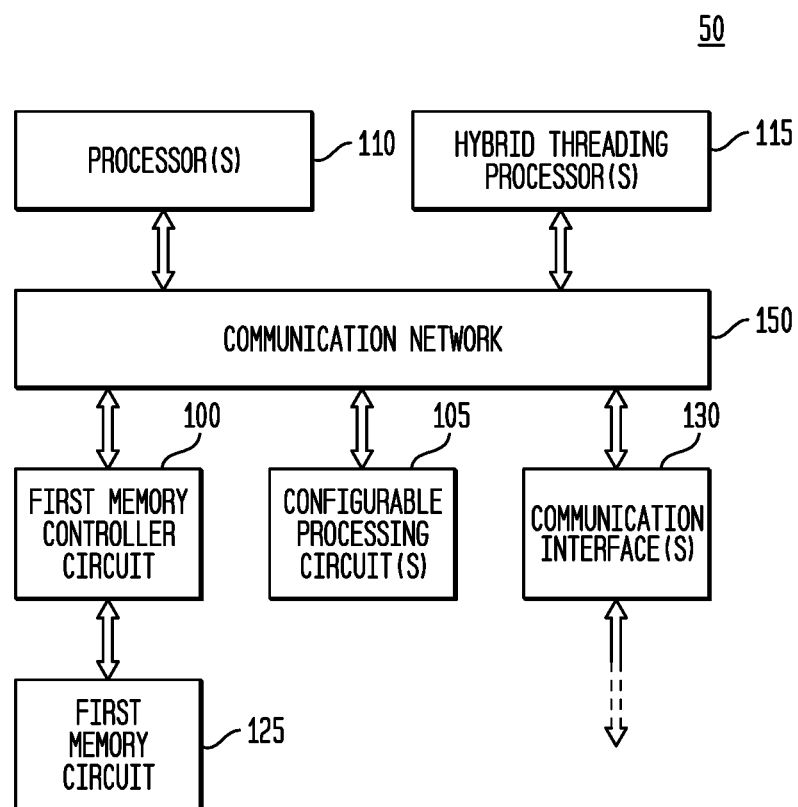
FIG. 1 is a block diagram of a representative first computing system embodiment.

While the present invention is susceptible of embodiment in many different forms, there are shown in the drawings and will be described herein in detail specific exemplary embodiments thereof, with the understanding that the present disclosure is to be considered as an exemplification of the principles of the invention and is not intended to limit the invention to the specific embodiments illustrated. In this respect, before explaining at least one embodiment consistent with the present invention in detail, it is to be understood that the invention is not limited in its application to the details of construction and to the arrangements of components set forth above and below, illustrated in the drawings, or as described in the examples. Methods and apparatuses consistent with the present invention are capable of other embodiments and of being practiced and carried out in various ways. Also, it is to be understood that the phraseology and terminology employed herein, as well as the abstract included below, are for the purposes of description and should not be regarded as limiting.

Figure 2:
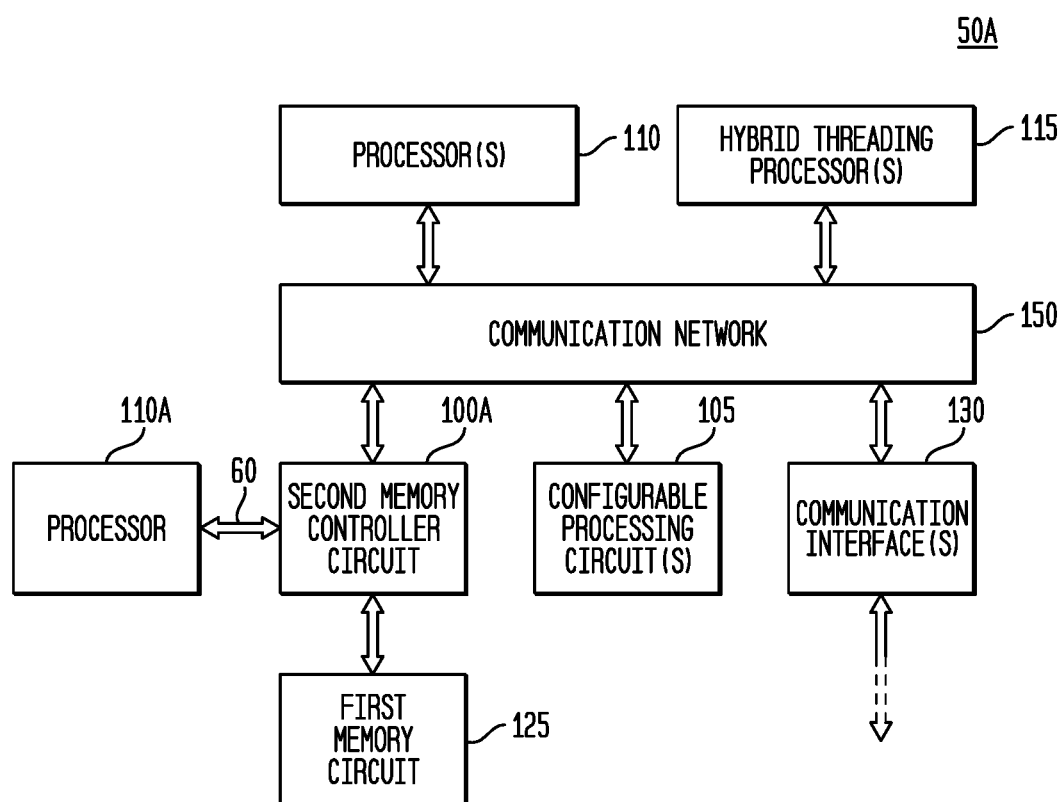
FIG. 2 is a block diagram of a representative second computing system embodiment.
Figure 3:
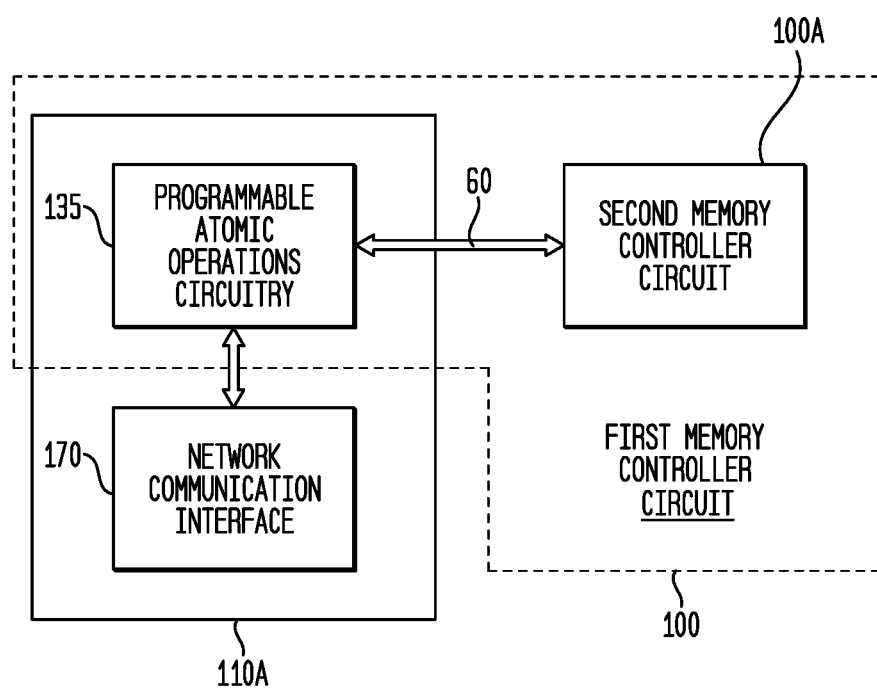
FIG. 3 is a high-level block diagram of a representative first and second memory controller circuits.
Figure 4:
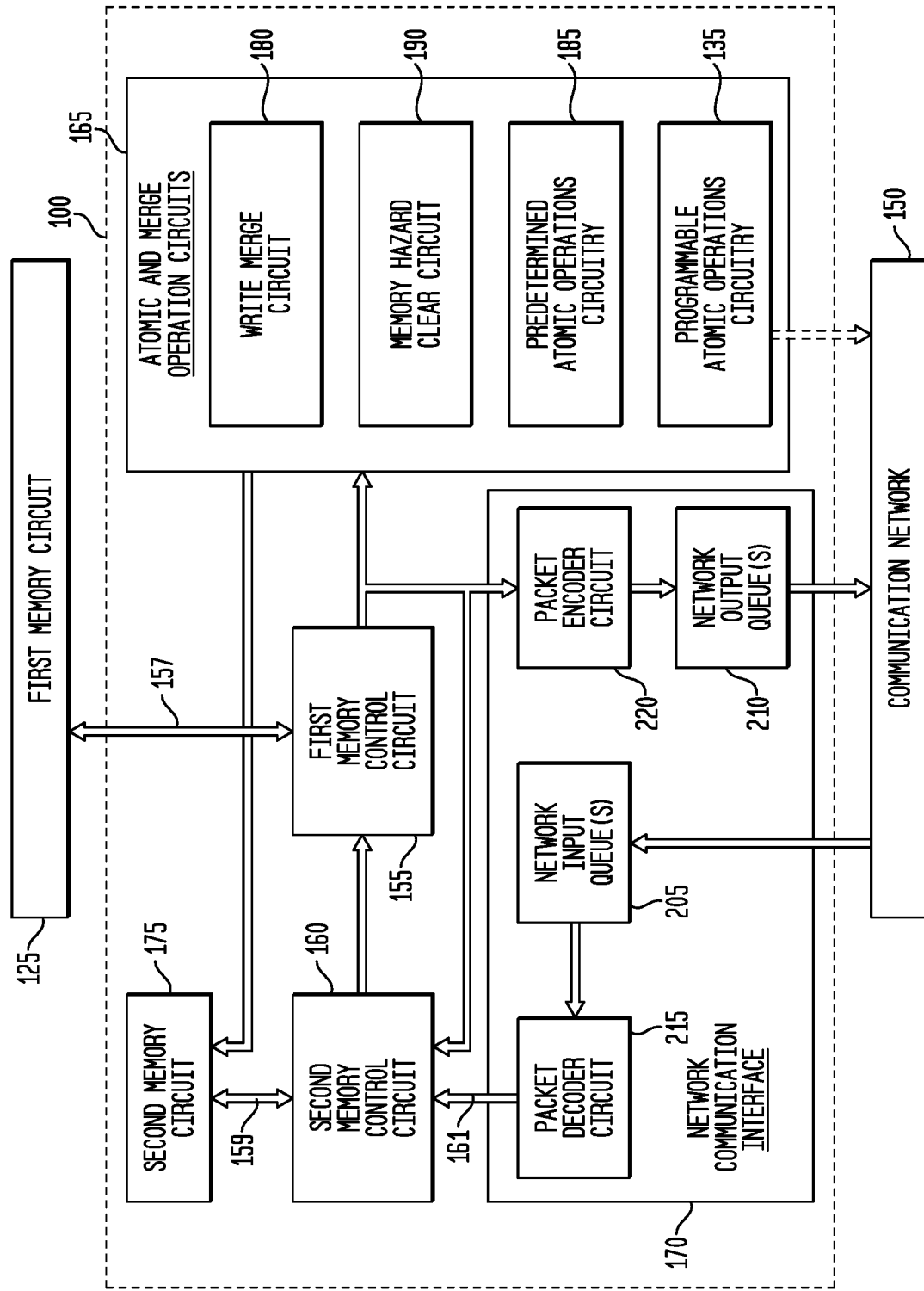
FIG. 4 is a block diagram of a representative first memory controller circuit embodiment.
Figure 5:
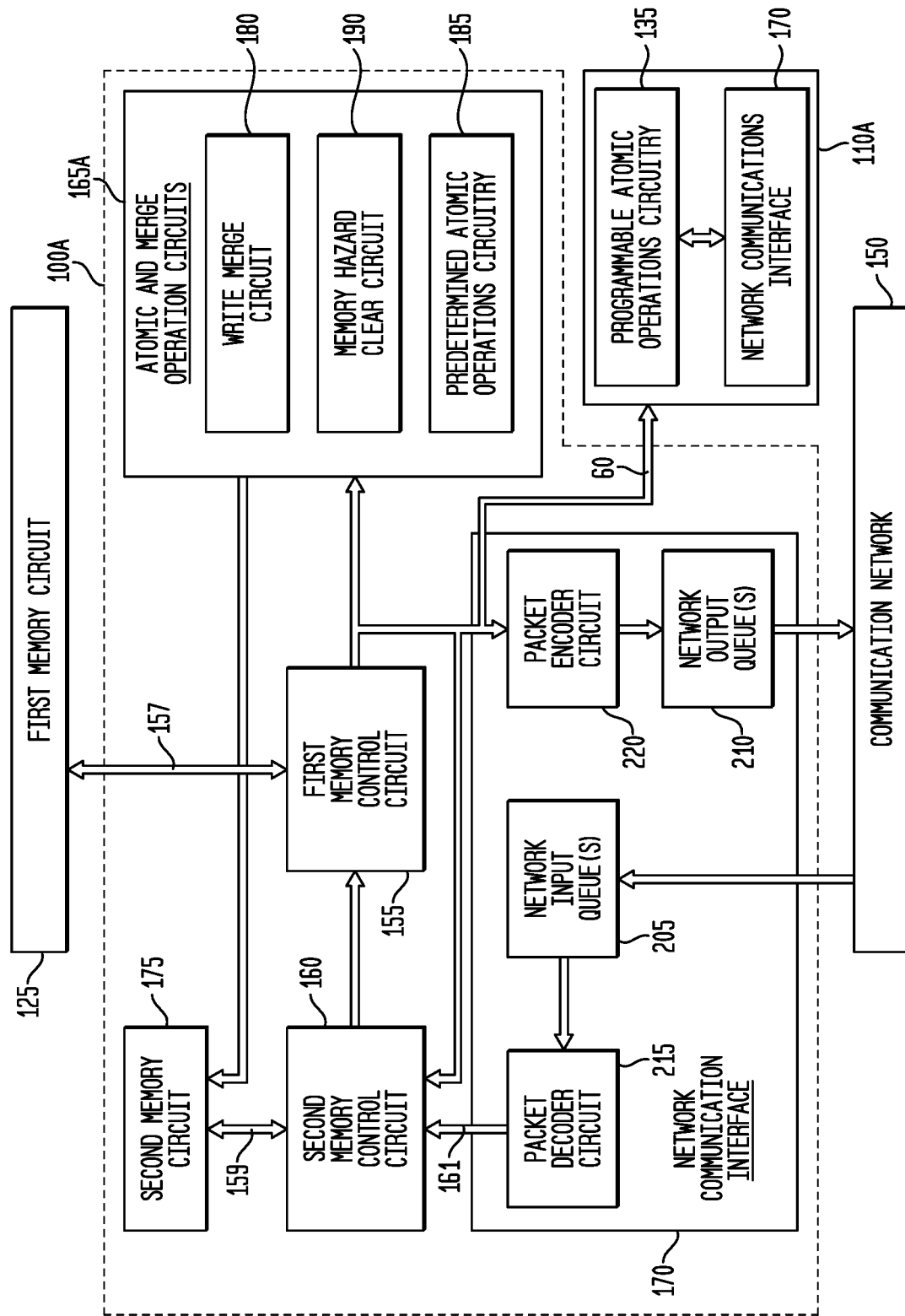
FIG. 5 is a block diagram of a representative second memory controller circuit embodiment.
Figure 6B:
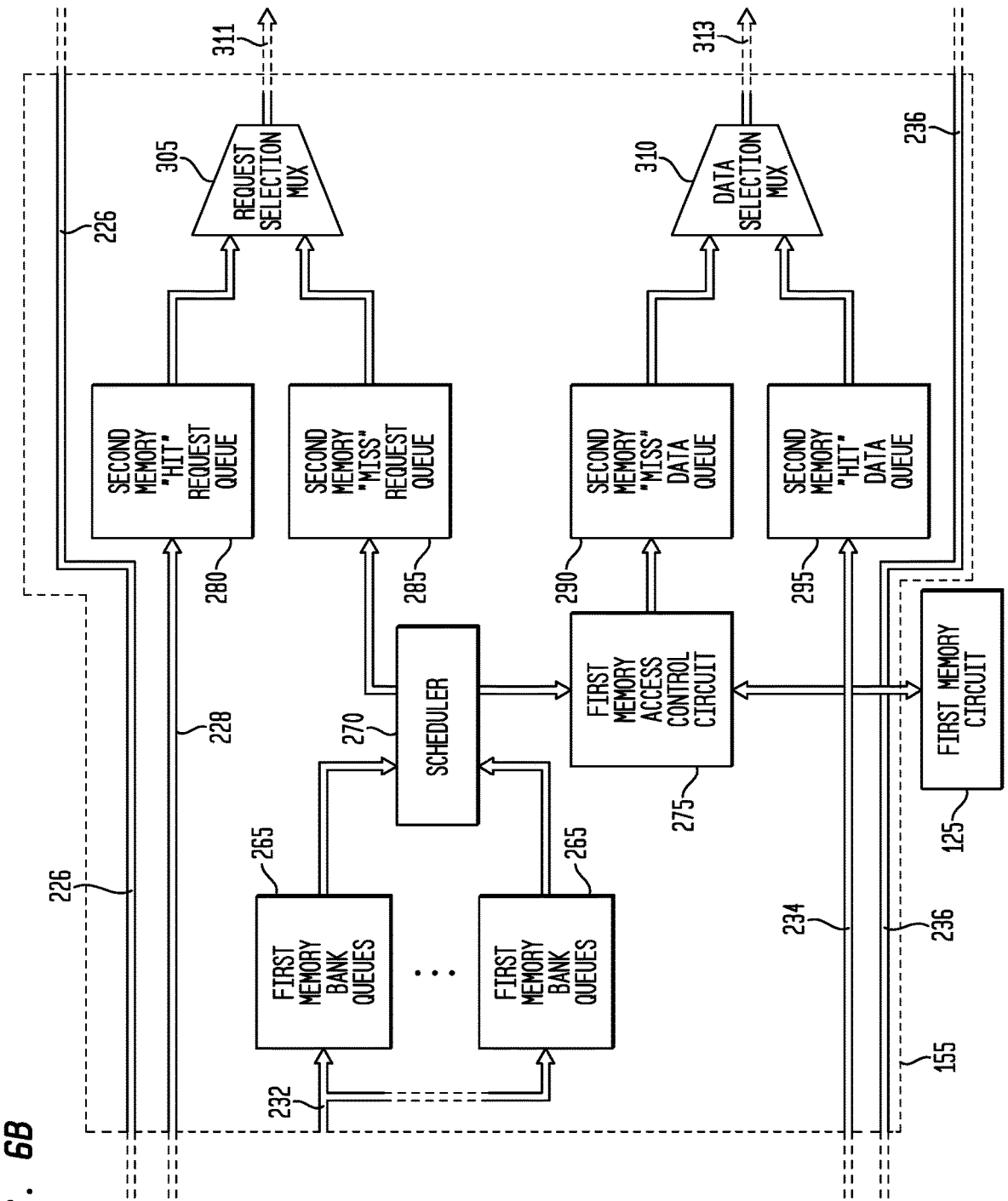
in FIG. 6B, a representative first memory control circuit embodiment (which is coupled to the second memory control circuit illustrated in FIG. 6A); and in FIG. 6C, a representative atomic and merge operations circuit (which is coupled to the first memory control circuit illustrated in FIG. 6B).
Figure 6C:
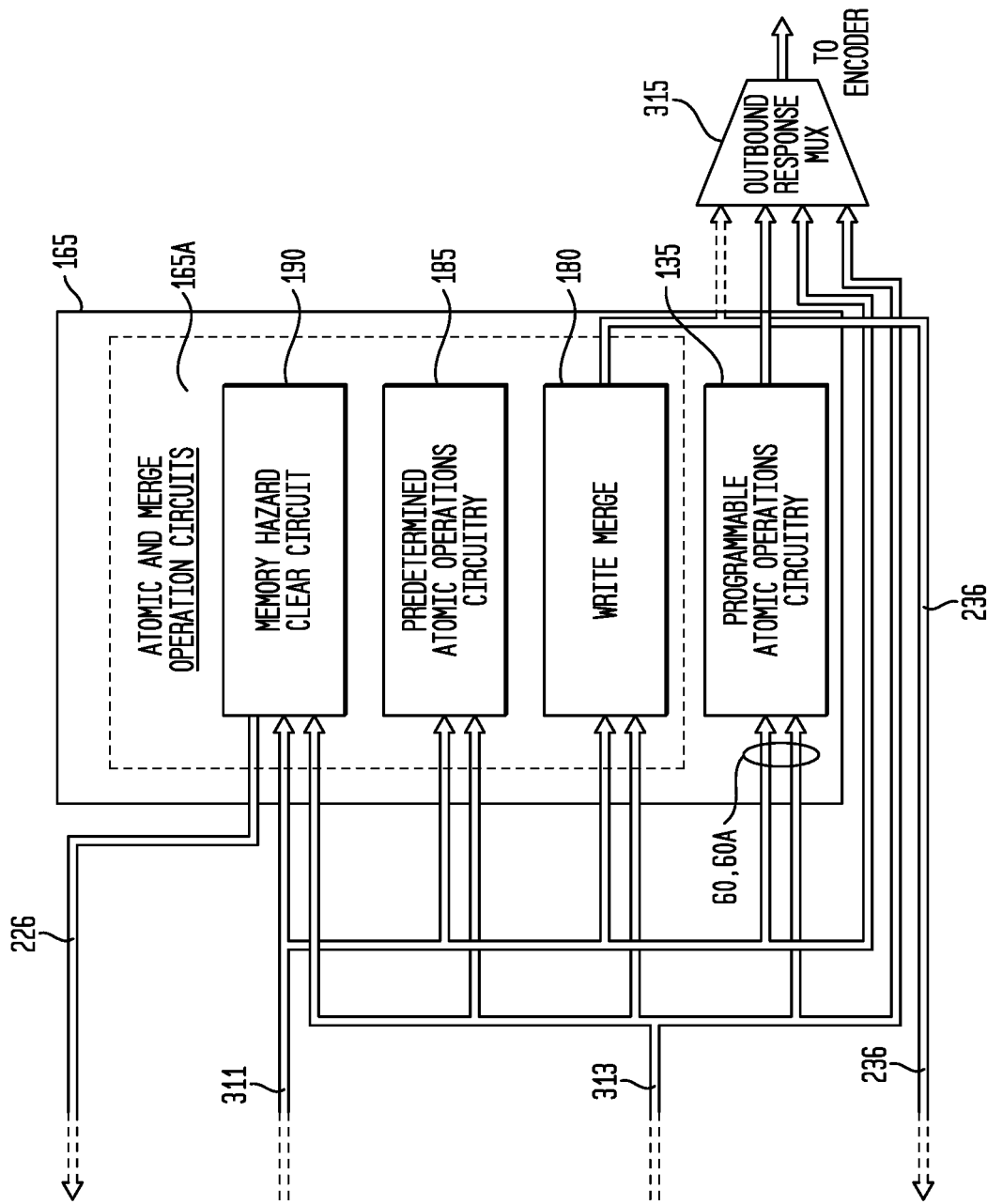
FIG. 6, which has been divided into sequential FIGS. 6A, 6B, and 6C (collectively referred to as FIG. 6) are block diagrams of, respectively, in FIG. 6A, a representative second memory control circuit embodiment.

FIG. 1 is a block diagram of a representative first computing system 50 embodiment. FIG. 2 is a block diagram of a representative second computing system 50A embodiment. FIG. 3 is a high-level block diagram of a representative first and second memory controller circuits. FIG. 4 is a block diagram of a representative first memory controller circuit 100 embodiment. FIG. 5 is a block diagram of a representative second memory controller circuit 100A embodiment. FIG. 6, illustrated as FIGS. 6A, 6B, and 6C, are block diagrams of, respectively, a representative second memory control circuit embodiment, a representative first memory control circuit embodiment, and a representative atomic and merge operations circuit.

FIGS. 1 and 2 show different first and second computing system 50, 50A embodiments which include additional components forming comparatively larger and smaller systems 50, 50A, any and all of which are within the scope of the disclosure. As shown in FIGS. 1 and 2, which may each be an arrangement suitable for a system-on-a-chip ("SOC"), for example and without limitation, a computing system 50, 50A, in various combinations as illustrated, may include one or more processors 110, a communication network 150, optionally one or more hybrid threading processors ("HTPs") 115, optionally one or more configurable processing circuits 105, various one or more optional communication interfaces 130, a first memory controller circuit 100 in the first computing system 50 or a second memory controller circuit 100A in the second computing system 50A, and in both first and second computing system 50, 50A, a first memory circuit 125 which is coupled, respectively, to either the first memory controller circuit 100 or the second memory controller circuit 100A.

Referring to FIG. 3, the first memory controller circuit 100 differs from the second memory controller circuit 100A insofar as the first memory controller circuit 100 further includes programmable atomic operations circuitry 135 as an integrated device, i.e., the first memory controller circuit 100 comprises all of the functionality and circuitry of a second memory controller circuit 100A, and further comprises programmable atomic operations circuitry 135. A processor 110, 110A comprises programmable atomic operations circuitry 135 and other, additional circuitry, such as network communication interface circuitry 170 or other or additional communication and processing circuitry, for example and without limitation. The programmable atomic operations circuitry 135 is utilized for performance of programmable atomic operations. In the first memory controller circuit 100, those programmable atomic operations are performed within the programmable atomic operations circuitry 135 of the first memory controller circuit 100. In the second memory controller circuit 100A, those programmable atomic operations are performed in conjunction with the programmable atomic operations circuitry 135 of the separate processor 110A.

In the second computing system 50A, the second memory controller circuit 100A is directly coupled, such as through a separate bus structure 60, to a processor 110A, either as separate integrated circuits or as separate chiplets, for example and without limitation. As discussed in greater detail below, such a processor 110A may be implemented to be identical to a processor 110, or may be implemented as a different or simpler processor designed to mostly or only implement programmable atomic operations. The processor 110A is illustrated separately solely to illustrate that the second memory controller circuit 100A has a direct, rather than switched or routed, communication path to and from the processor 110A. For example, a processor 110 may be utilized to implement a processor 110A, with the processor 110A additionally provided with the direct communication path (e.g., bus 60) to the second memory controller circuit 100A. As indicated previously, the first memory controller circuit 100 differs from the second memory controller circuit 100A only insofar as the first memory controller circuit 100 includes the additional circuitry and functionality of programmable atomic operations circuitry 135 as an integrated device, such as within a single integrated circuit or as part of an SOC, whereas a second memory controller circuit 100A communicates directly with programmable atomic operations circuitry 135 which is part of a separate processor 110A, as illustrated in FIG. 3. Stated another way, in such an integrated device, the first memory controller circuit 100 comprises all of the identical circuitry and functionality of a second memory controller circuit 100A and further comprises the additional programmable atomic operations circuitry 135. Accordingly, unless the description or context otherwise indicates, the first and second memory controller circuits 100, 100A are described herein collectively, with any and all description and specification applicable to both the first and second memory controller circuits 100, 100A.

A processor 110, 110A is typically a multi-core processor, which may be embedded within the first or second computing system 50, 50A, or which may be an external processor coupled into the first or second computing system 50, 50A via a communication interface 130, such as a PCIe-based interface. Such a processor may be implemented as known or becomes known in the electronic arts, and as described in greater detail below. The communication interface 130, such as a PCIe-based interface, may be implemented as known or becomes known in the electronic arts, and provides communication to and from the system 50, 50A and another, external device.

The programmable atomic operations circuitry 135 of a first memory controller circuit 100 or of a processor 110, 110A may be RISC-V ISA based multi-threaded processor having one or more processor cores 605, for example, and further having an extended instruction set for executing programmable atomic operations, as discussed in greater detail below with reference to FIG. 11. When provided with the extended instruction set for executing programmable atomic operations, representative programmable atomic operations circuitry 135 and/or processors 110, 110A may be embodied as one or more hybrid threading processor(s) 115 described in U.S. patent application Ser. No. 16/176,434 (all of which is hereby incorporated herein by reference in its entirety with the same full force and effect as if set forth in its entirety herein), for example and without limitation. Generally, the programmable atomic operations circuitry 135 of a first memory controller circuit 100 or of a processor 110, 110A provides barrel-style, round-robin instantaneous thread switching to maintain a high instruction-per-clock rate.

The communication network 150 also may be implemented as known or becomes known in the electronic arts. For example, in a representative embodiment, the communication network 150 is a packet-based communication network providing data packet routing between and among the processor(s) 110, 110A, the first or second memory controller circuits 100, 100A, optionally one or more hybrid threading processors 115, optionally one or more configurable processing circuits 105, and various one or more optional communication interfaces 130. In such a packet-based communication system, each packet typically includes destination and source addressing, along with any data payload and/or instruction. For example, for purposes of this disclosure, first or second memory controller circuits 100, 100A may receive a packet having a source address, a read (or load) request, and a physical address in the first memory circuit 125. In response, and as describe in greater detail below, the first or second memory controller circuits 100, 100A will read the data from the specified address (which may be in the first memory circuit 125 or in second memory circuit 175, as discussed below), and assemble a response packet to the source address containing the requested data. Similarly, first or second memory controller circuits 100, 100A may receive a packet having a source address, a write (or store) request, and a physical address in the first memory circuit 125. In response, and as describe in greater detail below, the first or second memory controller circuits 100, 100A will write the data to the specified address (which may be in the first memory circuit 125 or in second memory circuit 175, as discussed below), and assemble a response packet to the source address containing an acknowledgement that the data was stored to a memory (which may be in the first memory circuit 125 or in second memory circuit 175, as discussed below).

As an example and without limitation, the communication network 150 may be embodied as a plurality of crossbar switches having a folded clos configuration, and/or a mesh network providing for additional connections, depending upon the system 50, 50A embodiment. Also for example and without limitation, the communication network 150 may be part of an asynchronous switching fabric, meaning that a data packet may be routed along any of various paths, such that the arrival of any selected data packet at an addressed destination may occur at any of a plurality of different times, depending upon the routing. Also for example and without limitation, the communication network 150 may be implemented as a synchronous communication network, such as a synchronous mesh communication network. Any and all such communication networks 150 are considered equivalent and within the scope of the disclosure. A representative embodiment of a communication network 150 is also described in U.S. patent application Ser. No. 16/176,434.

The optional one or more hybrid threading processors 115 and one or more configurable processing circuits 105 are discussed in greater detail in various related applications, such as U.S. patent application Ser. No. 16/176,434, and are illustrated to provide examples of the various components which may be included within a computing system 50, 50A.

Referring to FIG. 4, a first memory controller circuit 100 is coupled to a first memory circuit 125, such as for write (store) operations and read (load) operations to and from the first memory circuit 125. The first memory controller circuit 100 comprises a first memory control circuit 155, a second memory control circuit 160, atomic and merge operation circuits 165, a second memory circuit 175, and a network communication interface 170. The network communication interface 170 is coupled to the communication network 150, such as via bus or other communication structures 163, which typically include address (routing) lines and data payload lines (not separately illustrated). The first memory control circuit 155 is directly coupled to the first memory 125, such as via a bus or other communication structure 157, to provide write (store) operations and read (load) operations to and from the first memory circuit 125. The first memory control circuit 155 is also coupled for output to the atomic and merge operation circuits 165 and, for input, to the second memory control circuit 160. The second memory control circuit 160 is directly coupled to the second memory circuit 175, such as via a bus or other communication structure 159, coupled to the network communication interface 170 for input (such as incoming read or write requests), such as via a bus or other communication structure 161, and coupled for output to the first memory control circuit 155. It should be noted that the second memory circuit 175 is typically part of the same integrated circuit having the first or second memory controller circuit 100, 100A. The atomic and merge operation circuits 165 is coupled to receive (as input) the output of the first memory control circuit 155, and to provide output to the second memory circuit 175, the network communication interface 170 and/or directly to the communication network 150.

Referring to FIG. 5, a second memory controller circuit 100A is coupled to a first memory circuit 125, such as for write (store) operations and read (load) operations to and from the first memory circuit 125, and to a processor 110A. The second memory controller circuit 100A comprises a first memory control circuit 155, a second memory control circuit 160, atomic and merge operation circuits 165A, a second memory circuit 175, and a network communication interface 170. The network communication interface 170 is coupled to the communication network 150, such as via bus or other communication structures 163, which typically include address (routing) lines and data payload lines (not separately illustrated). The first memory control circuit 155 is directly coupled to the first memory 125, such as via a bus or other communication structure 157, to provide write (store) operations and read (load) operations to and from the first memory circuit 125. The first memory control circuit 155 is also coupled for output to the atomic and merge operation circuits 165A and, for input, to the second memory control circuit 160. The second memory control circuit 160 is directly coupled to the second memory circuit 175, such as via a bus or other communication structure 159, coupled to the network communication interface 170 for input (such as incoming read or write requests), such as via a bus or other communication structure 161, and coupled for output to the first memory control circuit 155. The atomic and merge operation circuits 165A is coupled to receive (as input) the output of the first memory control circuit 155, and to provide output to the second memory circuit 175, the network communication interface 170 and/or directly to the communication network 150.

As mentioned above, referring to FIGS. 4 and 5, the first and second memory controller circuits 100, 100A differ insofar as the first memory controller circuit 100 includes programmable atomic operations circuitry 135 (in atomic and merge operation circuits 165), which is coupled to the first memory control circuit 155 through bus or communication lines 60 or 60A, and the second memory controller circuit 100A is coupled to programmable atomic operations circuitry 135 in a separate processor 110A, coupled to the first memory control circuit 155 through bus or communication lines 60. Accordingly, in the first memory controller circuit 100, the atomic and merge operation circuits 165 comprise a memory hazard clear (reset) circuit 190, a write merge circuit 180, predetermined atomic operations circuitry 185, and programmable atomic operations circuitry 135, and in the second memory controller circuit 100A, the atomic and merge operation circuits 165A comprise a memory hazard clear (reset) circuit 190, a write merge circuit 180 and predetermined atomic operations circuitry 185. The memory hazard clear (reset) circuit 190, write merge circuit 180 and the predetermined atomic operations circuitry 185 may each be implemented as state machines with other combinational logic circuitry (such as adders (and subtractors), shifters, comparators, AND gates, OR gates, XOR gates, etc.) or other logic circuitry, and may also include one or more registers or buffers to store operand or other data, for example. As mentioned above and as discussed in greater detail below, the programmable atomic operations circuitry 135 may be implemented as one or more processor cores and control circuitry, and various state machines with other combinational logic circuitry (such as adders, shifters, etc.) or other logic circuitry, and may also include one or more registers, buffers, and/or memories to store addresses, executable instructions, operand and other data, for example, or may be implemented as a processor 110, or a processor more generally (as described below). It should be noted that the memory hazard clear (reset) circuit 190 is not required to be a separate circuit in the atomic and merge operation circuits 165, 165A and instead may be part of the memory hazard control circuit 230.

The network communication interface 170 includes network input queues 205 to receive data packets (including read and write request packets) from the communication network 150; network output queues 210 to transfer data packets (including read and write response packets) to the communication network 150; a data packet decoder circuit 215 to decode incoming data packets from the communication network 150, to take data (in designated fields, such as request type, source address, and payload data) and transfer the data provided in the packet to the second memory control circuit 160; and data packet encoder circuit 220 to encode outgoing data packets (such as responses to requests to the first memory circuit 125), for transmission on the communication network 150. The data packet decoder circuit 215 and the data packet encoder circuit 220 may each be implemented as state machines or other logic circuitry.

The first memory circuit 125 and the second memory circuit 175 may be any type or kind of memory circuit, as discussed in greater detail below, such as, for example and without limitation, such as RAM, FLASH, DRAM, SDRAM, SRAM, MRAM, FeRAM, ROM, EPROM or $E^2$PROM, or any other form of memory device. In a representative embodiment, the first memory circuit 125 is DRAM, typically an external DRAM memory device, and the second memory circuit 175 is an SRAM data cache. For example, the first memory circuit 125 may be a separate integrated circuit in its own packaging, or a separate integrated circuit which may be included in packaging with the first and second memory controller circuits 100, 100A, such as by sharing a common interposer. In addition, multiple first memory circuits 125 may be optionally included. For example and without limitation, the first memory circuit 125 may be a Micron GDDR6 memory IC or a Micron NGM memory IC (Micron's next generation DRAM device), currently available from Micron Technology, Inc., 8000 S. Federal Way, Boise, Idaho, 83716, US. Such a GDDR6 device is a JEDEC standard with 16 Gb density, and a peak 64 GB/s per device.

The second memory circuit 175 (e.g., an SRAM cache) is a memory side cache and is accessed by physical addresses. In a representative embodiment, the second memory circuit 175 may be 1 MB in size with 256B line size. The 256B line size is chosen to minimize the reduction in achievable bandwidth due to ECC support. Larger line size is possible based on application simulations. Having a memory line size of 256B has the benefit of reducing energy as compared to smaller line sizes, assuming the majority of the accessed second memory circuit 175 is eventually used. In a representative embodiment, the requests from the communication network 150 will access the second memory circuit 175 with accesses sized from a single byte up to 64 bytes. The tags of the second memory circuit 175 (e.g., an SRAM cache) should be able to handle partial line reads and writes.

The second memory circuit 175 (as a cache) is beneficial for repetitive atomic operations to the same memory line. An application will use a barrier synchronization operation to determine when all threads of a process have finished processing a section of an application. An in-memory atomic counting operator is used to determine when all threads have entered the barrier. There are as many atomic counting operations as there are threads in the section of the application. Performing atomic operations on the data within the cache can allow these barrier counting operations to complete with just a few clocks per operation.

A second, high benefit use of the second memory circuit 175 is caching accesses from the configurable processing circuits 105. In a representative embodiment, the configurable processing circuits 105 do not have a cache, but rather data is streamed into and out of internal memory. The second memory circuit 175 allows accesses to the same cache line to be efficiently handled.

At a high level, and as discussed in greater detail below (with respect to the representative embodiment illustrated in FIG. 6), referring to FIGS. 1-5, the first and second memory controller circuits 100, 100A may receive a data read (data load) request from within the computing system 50, 50A, which has a physical memory address, and which is decoded in the data packet decoder circuit 215 of the network communication interface 170, and transferred to the second memory control circuit 160. The second memory control circuit 160 will determine if the requested data corresponding to the physical memory address is within the second memory circuit 175, and if so, will provide the requested data (along with the corresponding request having the address of the requestor (source)) to the first memory control circuit 155 and eventually on to the data packet encoder circuit 220 to encode outgoing data packets for transmission on the communication network 150. When the requested data corresponding to the physical memory address is not within the second memory circuit 175, the second memory control circuit 160 will provide the request (and/or the physical memory address) to the first memory control circuit 155, which will access and obtain the requested data from the first memory circuit 125. In addition to providing the requested data to the data packet encoder circuit 220 to encode outgoing data packets for transmission on the communication network 150, the first memory control circuit 155 provides the data to the write merge circuit 180, which will also write the data to the second memory circuit 175.

This additional writing of the requested data to a local cache, such as to the second memory circuit 175, provides a significant reduction in latency, and is a significant and novel feature of the representative embodiments. For example, this requested data may be required more frequently than other stored data, so having it stored locally reduces the latency (i.e., period of time involved) which would otherwise be required to fetch the data from the first memory circuit 125.

Essentially, the use of the second memory circuit 175 as a local cache provides reduced latency for repetitively accessed memory locations (in the first memory circuit 125). In addition, the second memory circuit 175 provides a read buffer for sub-memory line accesses, i.e., accesses to the first memory circuit 125 which do not require the entire memory line of the first memory circuit 125. This use of the second memory circuit 175 is also particularly beneficial for compute elements in the system 50, 50A which have small or no data caches.

The first and/or second memory controller circuit 100, 100A is responsible for optimally controlling the first memory circuit 125 (e.g., GDDR6 RAM) to load the second memory circuit 175 (as a cache) with requested data upon a cache miss, and store data from the second memory circuit 175 when a cache line is transferred out of the second memory circuit 175, i.e., evicted to make room for other incoming data. The GDDR6 device, as representative embodiment of a first memory circuit 125, for example and without limitation, has two independent channels, each 16-bits wide running at 16 GT/s. A single GDDR6 device can support a peak bandwidth of 64 GB/s. The GDDR6 device has a channel burst length of 16, resulting in a 32B burst of data. Four bursts from each open row (i.e., 128 bytes) are required to achieve full memory bandwidth. The bandwidth may be reduced when some of the bits are utilized for error correction coding ("ECC").

As part of this, the second memory control circuit 160 will reserve a cache line in the second memory circuit 175, by setting a hazard bit (in hardware), so that cache line cannot be read, overwritten or modified by another process. As discussed in greater detail below, this process may also remove or "evict" the data currently occupying the reserved cache line, which will then be provided to the first memory control circuit 155 to write (store) this data to be replaced or "evicted" from the second memory circuit 175 and stored in or to the first memory circuit 125. Following the additional writing of the requested data to the second memory circuit 175, any corresponding hazard bit which was set will be cleared (reset) by the memory hazard clear (reset) circuit 190.

Similarly, the first and second memory controller circuits 100, 100A may receive a data write (data store) request from within the computing system 50, 50A, which has a physical memory address, and which is decoded in the data packet decoder circuit 215 of the network communication interface 170, and transferred to the second memory control circuit 160. The second memory control circuit 160 will write (store) the locally, in the second memory circuit 175. As part of this, the second memory control circuit 160 may reserve a cache line in the second memory circuit 175, by setting a hazard bit (in hardware), so that cache line cannot be read by another process while it is in transition. As discussed in greater detail below, this process may also remove or "evict" the data currently occupying the reserved cache line, which will also be written (stored) to the first memory circuit 125. Following the writing/storing of the requested data to the second memory circuit 175, any corresponding hazard bit which was set will be cleared (reset) by the memory hazard clear (reset) circuit 190.

Predetermined types of atomic operations may also be performed by the predetermined atomic operations circuitry 185 of the atomic and merge operation circuits 165, involving requests for a predetermined or "standard" atomic operation on the requested data, such as a comparatively simple, single cycle, integer atomics, e.g., fetch-and-increment or compare-and-swap, which will occur with the same throughput as a regular memory read or write operation not involving an atomic operation, such as an increment by one atomic operation. For these operations, as discussed in greater detail below, the second memory control circuit 160 will reserve a cache line in the second memory circuit 175, by setting a hazard bit (in hardware), so that cache line cannot be read by another process while it is in transition. The data is obtained from either the first memory circuit 125 or the second memory circuit 175, and is provided to the predetermined atomic operations circuitry 185 to perform the requested atomic operation. Following the atomic operation, in addition to providing the resulting data to the data packet encoder circuit 220 to encode outgoing data packets for transmission on the communication network 150, the predetermined atomic operations circuitry 185 provides the resulting data to the write merge circuit 180, which will also write the resulting data to the second memory circuit 175. Following the writing/storing of the resulting data to the second memory circuit 175, any corresponding hazard bit which was set will be cleared (reset) by the memory hazard clear (reset) circuit 190.

Customized or programmable atomic operations may be performed by the programmable atomic operations circuitry 135 (which may be part of the first memory controller circuit 100 or a processor 110A), involving requests for a programmable atomic operations on the requested data. Any user may prepare any such programming code to provide such customized or programmable atomic operations, subject to various constraints described below. For example, the programmable atomic operations may be comparatively simple, multi-cycle operations such as floating point addition, or comparatively complex, multi-instruction operations such as a bloom filter insert. The programmable atomic operations can be the same as or different than the predetermined atomic operations, insofar as they are defined by the user rather than a system vendor. For these operations, also as discussed in greater detail below, the second memory control circuit 160 will reserve a cache line in the second memory circuit 175, by setting a hazard bit (in hardware), so that cache line cannot be read by another process while it is in transition. The data is obtained from either the first memory circuit 125 or the second memory circuit 175, and is provided to the programmable atomic operations circuitry 135 (e.g., within the first memory controller circuit 100 or on dedicated communication link 60 to a processor 110A) to perform the requested programmable atomic operation. Following the atomic operation, the programmable atomic operations circuitry 135 will provide the resulting data to the network communication interface 170 (within the first memory controller circuit 100 or within a processor 110A) to directly encode outgoing data packets having the resulting data for transmission on the communication network 150. In addition, the programmable atomic operations circuitry 135 will provide the resulting data to the second memory control circuit 160, which will also write the resulting data to the second memory circuit 175. Following the writing/storing of the resulting data to the second memory circuit 175, any corresponding hazard bit which was set will be cleared (reset) by the second memory control circuit 160.

The approach taken for programmable (i.e., "custom") atomic operations is to provide multiple, generic, custom atomic request types that can be sent through the communication network 150 to the first and/or second memory controller circuits 100, 100A, from an originating source such as a processor 110 or other system 50, 50A component. As discussed in greater detail below, the first and second memory controller circuits 100, 100A identify the request as a custom atomic and forward the request to the programmable atomic operations circuitry 135, either within the first memory controller circuit 100 or within a processor 110A. In a representative embodiment, the programmable atomic operations circuitry 135: (1) is a programmable processing element capable of efficiently performing a user defined atomic operation; (2) can perform load and stores to memory, arithmetic and logical operations and control flow decisions; and (3) leverages the RISC-V ISA with a set of new, specialized instructions to facilitate interacting with the first and/or second memory controller circuits 100, 100A or their components to atomically perform the user-defined operation. It should be noted that the RISC-V ISA contains a full set of instructions that support high level language operators and data types. The programmable atomic operations circuitry 135 may leverage the RISC-V ISA, but generally support a more limited set of instructions and limited register file size to reduce the die size of the unit when included within a first memory controller circuit 100.

Referring to FIG. 6, a second memory control circuit 160 comprises a second memory access control circuit 225; a memory hazard control circuit 230 having memory hazard registers 260; a network request queue 250; an atomic operation request queue 255; an inbound request multiplexer 245; an optional delay circuit 235, and an inbound control multiplexer 240. The second memory access control circuit 225 is coupled to the second memory circuit 175 (e.g., SRAM) and comprises state machine and logic circuits to read and write to the second memory circuit 175 with corresponding addressing, to provide signaling to the memory hazard control circuit 230 to set or clear the various memory hazard bits, and to generate cache "eviction" requests when a cache line of the second memory circuit 175 contains data which is to be overwritten by other data and which is to be written to the first memory circuit 125.

The memory hazard control circuit 230 comprises memory hazard registers 260 and optionally state machine and logic circuits to set or clear the various memory hazard bits stored in the memory hazard registers 260, thereby providing hardware-based cache coherency. A cache "miss", i.e., an incoming request for data which is not stored in the second memory circuit 175, requires access to the first memory circuit 125 to bring the desired data into the second memory circuit 175 (as a local cache). During this first memory circuit 125 access time, the memory line is not available for other requests. The memory hazard control circuit 230 maintains a table of hazard bits in the memory hazard registers 260 indicating which cache lines of the second memory circuit 175 are unavailable for access. An inbound request that tries to access such a cache line with a hazard bit set is held by the memory hazard control circuit 230 (or, equivalently, the memory hazard clear (reset) circuit 190) until the hazard is cleared. Once the hazard is cleared then the request is resent through the inbound request multiplexer 245 for processing. The tag address of the cache line of the second memory circuit 175 is hashed to a hazard bit index. The number of hazard bits is generally chosen to set the hazard collision probability to a sufficiently low level.

The network request queue 250 provides a queue for inbound requests (e.g., load, store) from the communication network 150. The atomic operation request queue 255 provides a queue for resulting data from programmable atomic operations. The inbound request multiplexer 245 selects and prioritizes between inbound memory request sources, which are, in order of priority, requests from the memory hazard clear (reset) circuit 190, requests from the atomic operation request queue 255, and requests from the network request queue 250, and provides these requests to the second memory access control circuit 225. The optional delay circuit 235 is a pipeline stage to mimic the delay for a read operation from the second memory circuit 175. The inbound control multiplexer 240 selects from an inbound network request which requires accessing the first memory circuit 125 (i.e., a cache "miss", when the requested data was not found in the second memory circuit 175), and a cache "eviction" request from the second memory circuit 175 when a cache line of the second memory circuit 175 contains data which is to be written to the first memory circuit 125 prior to being overwritten by other incoming data (from either a read or write request).

A first memory control circuit 155 comprises a scheduler circuit 270; one or more first memory bank queues 265; a first memory access control circuit 275; one or more queues for output data and request data, namely, a second memory "hit" request queue 280, a second memory "miss" request queue 285, a second memory "miss" data queue 290, and a second memory "hit" data queue 295; a request selection multiplexer 305, and a data selection multiplexer 310.

The first memory bank (request) queues 265 are provided so that each separately managed bank of the first memory circuit 125 has a dedicated bank request queue 265 to hold requests until they can be scheduled on the associated bank of the first memory circuit 125. The scheduler circuit 270 selects across the bank queues 265 to choose a request for an available bank of the first memory circuit 125, and provides that request to the first memory access control circuit 275. The first memory access control circuit 275 is coupled to the first memory circuit 125 (e.g., DRAM) and comprises state machine and logic circuits to read (load) and write (store) to the first memory circuit 125 with corresponding addressing, such as row and column addressing, using the physical addresses of the first memory circuit 125.

The second memory "hit" data queue 295 holds read data provided directly from the second memory circuit 175 (on communication line(s) 234), i.e., data which was held in and read from the second memory circuit 175, until the requested data is selected for provision in a response message. The second memory "miss" data queue 290 holds read data provided from the first memory circuit 125, i.e., data which was held in and read from the first memory circuit 125 which was not in the second memory circuit 175, also until the requested data is selected for provision in a response message. The second memory "hit" request queue 280 holds request packet information (e.g., the source requestor's identifier or address used to provide addressing for a response packet) when the requested data was available in the second memory circuit 175, until the request is selected for preparation of a response message. The second memory "miss" request queue 285 holds request packet information (e.g., the source requestor's identifier or address used to provide addressing for a response packet) when the requested data was available in the first memory circuit 125 (and not in the second memory circuit 175), until the request is selected for preparation of a response message.

The data selection multiplexer 310 selects between first memory circuit 125 read data (held in the second memory "miss" data queue 290) and second memory circuit 175 read data (held in the second memory "hit" data queue 295). The selected data is also written to the second memory circuit 175, as mentioned above. Corresponding request data is then selected, using request selection multiplexer 305, which correspondingly selects between response data held in the second memory "miss" request queue 285 and response data held in the second memory "hit" request queue 280. That read data is then matched with corresponding request data so that a return data packet having the requested data may be assembled and transmitted on the communication network to the address of the request source. There are several different ways for this to occur, using the atomic and merge operation circuits 165 or using an optional outbound response multiplexer 315, discussed in greater detail below.

When included, the outbound response multiplexer 315 selects between (1) read data and request data provided either by the data selection multiplexer 310 and the request selection multiplexer 305; and (2) data generated by the programmable atomic operations circuitry 135 (when included in an atomic and merge operation circuits 165 of a first memory controller circuit 100) and the request data provided by the request selection multiplexer 305. In both cases, the read or generated data and the request data is provided by the outbound response multiplexer 315 to the network communication interface 170, to encode and prepare a response or return data packet for transmission on the communication network 150. In selected embodiments, the processor 110A performing the programmable atomic operation may itself directly encode and prepare a response or return data packet for transmission on the communication network 150.

The atomic and merge operation circuits 165, 165A comprise a write merge circuit 180, predetermined atomic operations circuitry 185, and a memory hazard clear (reset) circuit 190, with the atomic and merge operation circuits 165 further comprising programmable atomic operations circuitry 135. The write merge circuit 180 receives the read data from the data selection multiplexer 310 and the request data from the request selection multiplexer 305, and merges the request data and read data (to create a single unit having the read data and the source address to be used in the response or return data packet), which it then provides: (1) to the write port of the second memory circuit 175 (on line 236) (or, equivalently, to the second memory access control circuit 225 to write to the second memory circuit 175); (2) optionally, to an outbound response multiplexer 315, for selection and provision to the network communication interface 170, to encode and prepare a response or return data packet for transmission on the communication network 150; or (3) optionally, to the network communication interface 170, to encode and prepare a response or return data packet for transmission on the communication network 150. Alternatively, and as illustrated in FIG. 5C as another option, the outbound response multiplexer 315 may receive and select the read data directly from the data selection multiplexer 310 and the request data directly from the request selection multiplexer 305, for provision to the network communication interface 170, to encode and prepare a response or return data packet for transmission on the communication network 150.

When the request data is for a predetermined atomic operation, predetermined atomic operations circuitry 185 receives the request and read data, either from the write merge circuit 180 or directly from the data selection multiplexer 310 and the request selection multiplexer 305. The atomic operation is performed, and using the write merge circuit 180, the resulting data is written to (stored in) the second memory circuit 175, and also provided to the outbound response multiplexer 315 or directly to the network communication interface 170, to encode and prepare a response or return data packet for transmission on the communication network 150.

The predetermined atomic operations circuitry 185 handles predefined atomic operations such as fetch-and-increment or compare-and-swap (e.g., atomic operations listed in Table 1). These operations perform a simple read-modify-write operation to a single memory location of 32-bytes or less in size. Atomic memory operations are initiated from a request packet transmitted over the communication network 150. The request packet has a physical address, atomic operator type, operand size, and optionally up to 32-bytes of data. The atomic operation performs the read-modify-write to a second memory circuit 175 cache memory line, filling the cache memory if necessary. The atomic operator response may be a simple completion response, or a response with up to 32-bytes of data. Table 1 shows a list of example atomic memory operators in a representative embodiment. The request packet size field will specify the operand width for the atomic operation. In a representative embodiment, the various processors (e.g., programmable atomic operations circuitry 135, processor 110, 110A), hybrid threading processor(s) 115, configurable processing circuit(s) 105) are capable of supporting 32 and 64-bit atomic operations, and in some instances, atomic operations with 16 and 32 bytes.

TABLE 1

| Atomic Identifier | Atomic Description |
|---|---|
| 0 | Fetch-and-AND |
| 1 | Fetch-and-OR |
| 2 | Fetch-and-XOR |
| 3 | Fetch-and-Add |
| 4 | Fetch-and-Subtract |
| 5 | Fetch-and-Increment |
| 6 | Fetch-and-Decrement |
| 7 | Fetch-and-Minimum |
| 8 | Fetch-and-Maximum |
| 9 | Fetch-and-Swap (Exchange) |
| 10 | Compare-and-Swap |
| 11-15 | Reserved |
| 16-63 | Custom (Programmable) Atomic Operations |

As mentioned above, prior to the writing (storing) of the read data to the second memory circuit 175, the set hazard bit for the reserved cache line is to be cleared, by the memory hazard clear (reset) circuit 190. Accordingly, when the request and read data is received by the write merge circuit 180, a reset or clear signal may be transmitted by the memory hazard clear (reset) circuit 190 to the memory hazard control circuit 230 (on communication line 226), to reset or clear the set memory hazard bit for the reserved cache line in the registers 260. Alternatively, when the memory hazard clear (reset) circuit 190 is included the memory hazard control circuit 230, the write merge circuit 180 may transmit a reset or clear signal to the memory hazard control circuit 230 (on communication line 226), also to reset or clear the set memory hazard bit for the reserved cache line in the registers 260. Also as mentioned above, resetting or clearing of this hazard bit will also release a pending read or write request involving the designated (or reserved) cache line, providing the pending read or write request to the inbound request multiplexer 245 for selection and processing.

Figure 7B:
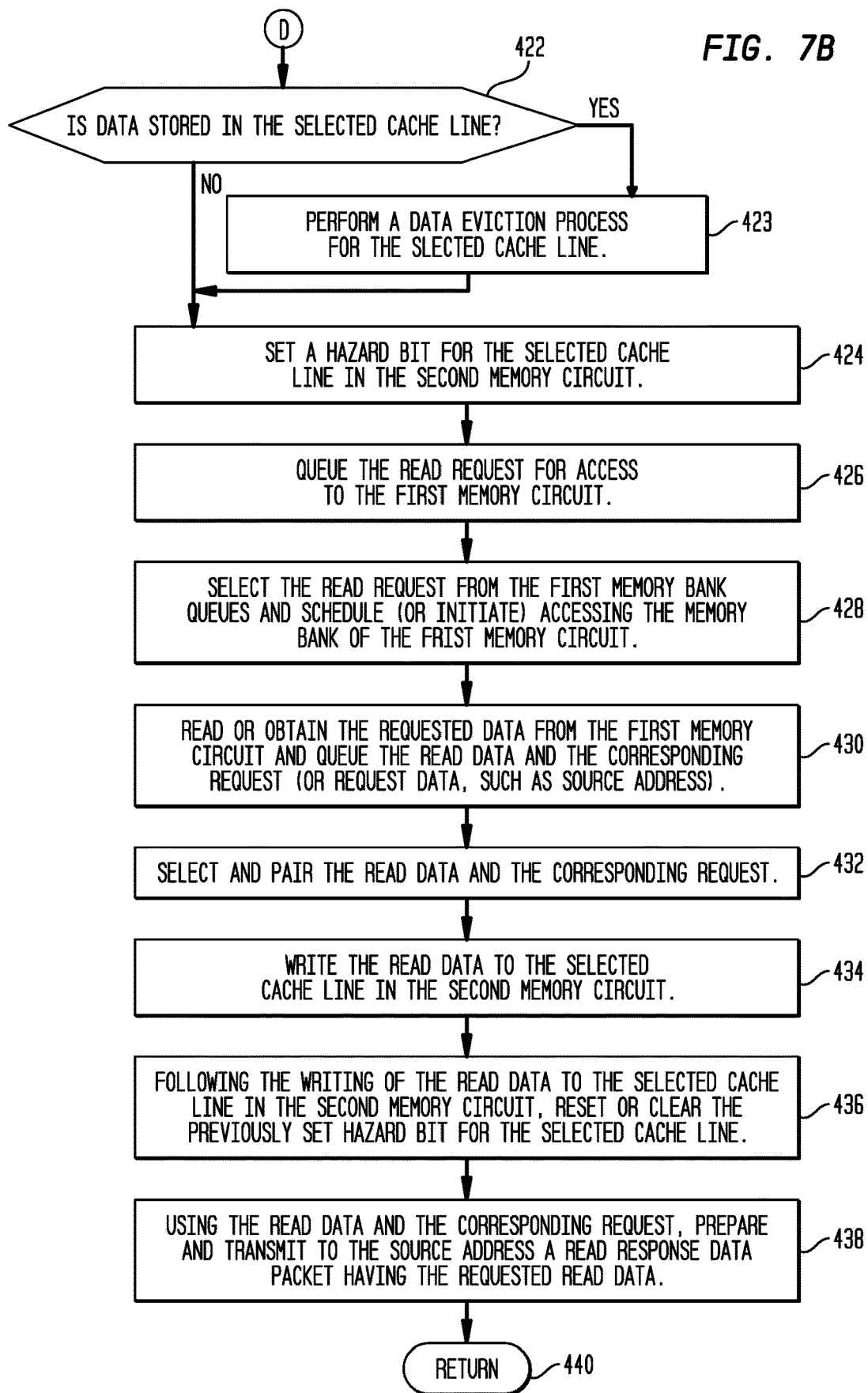
Figure 7C:
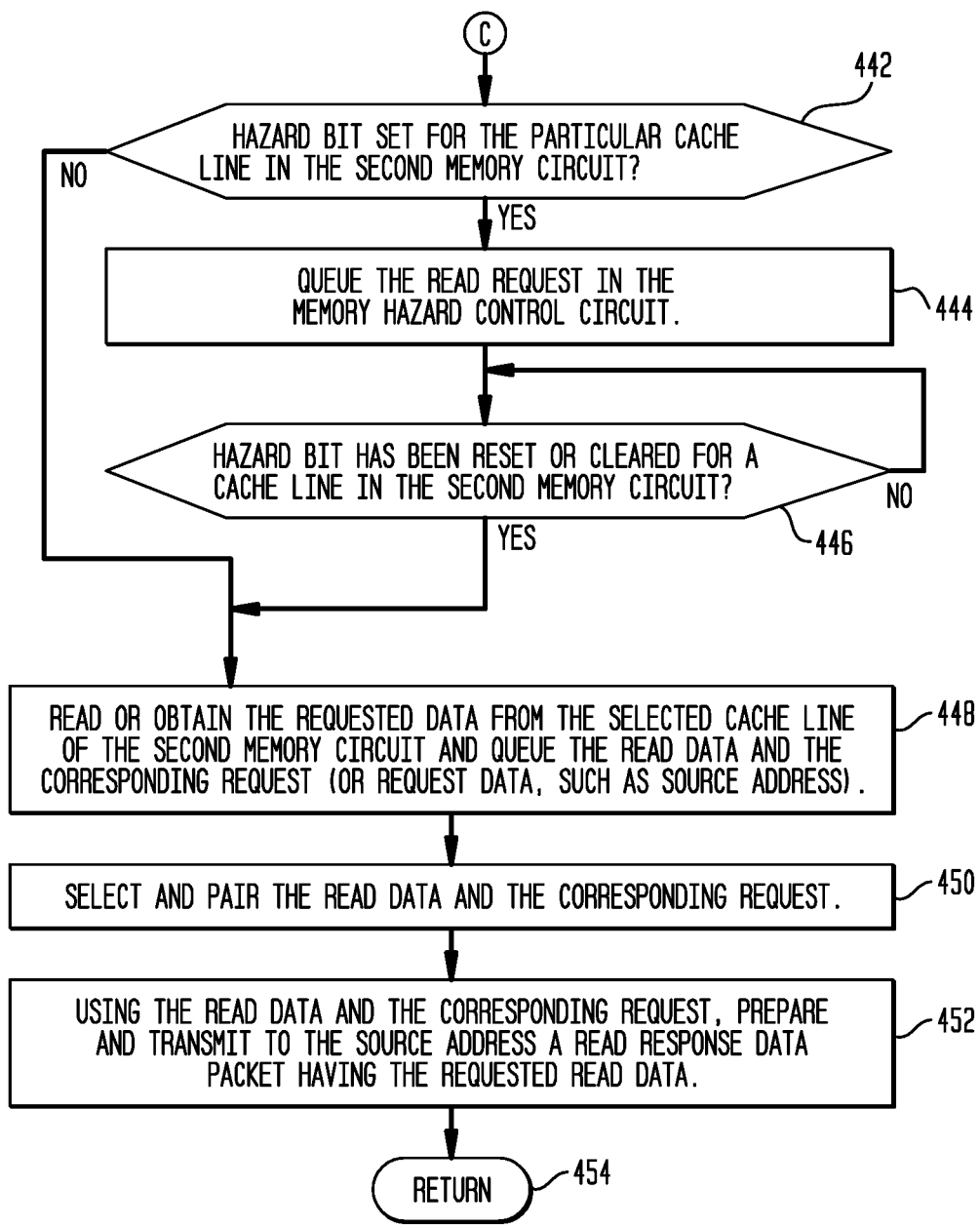
Figure 8A:
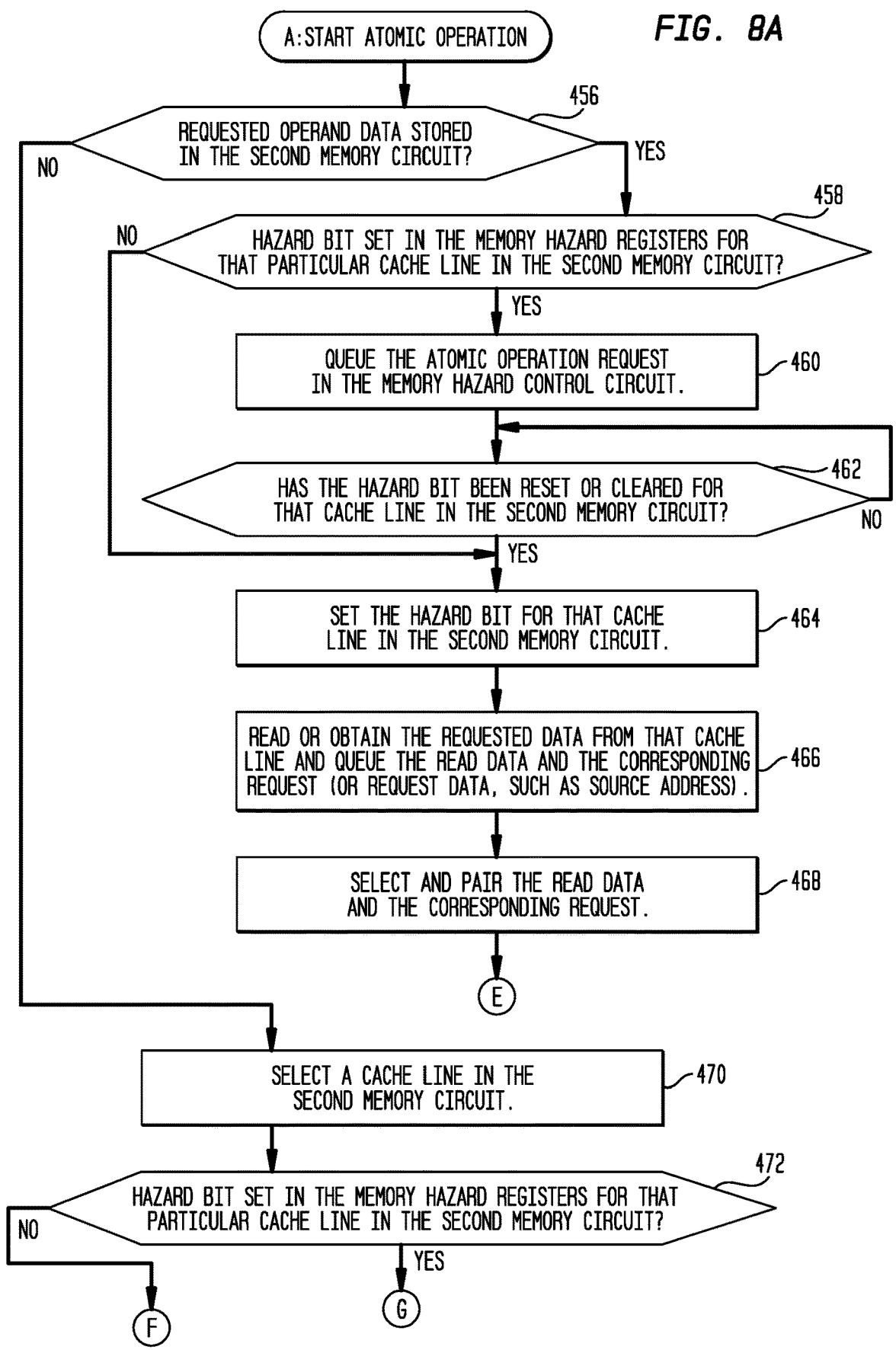
FIGS. 8A, 8B, 8C and 8D (collectively referred to as FIG. 8) are flow charts showing a representative method of performing an atomic operation as part of an atomic operation request.
Figure 8B:
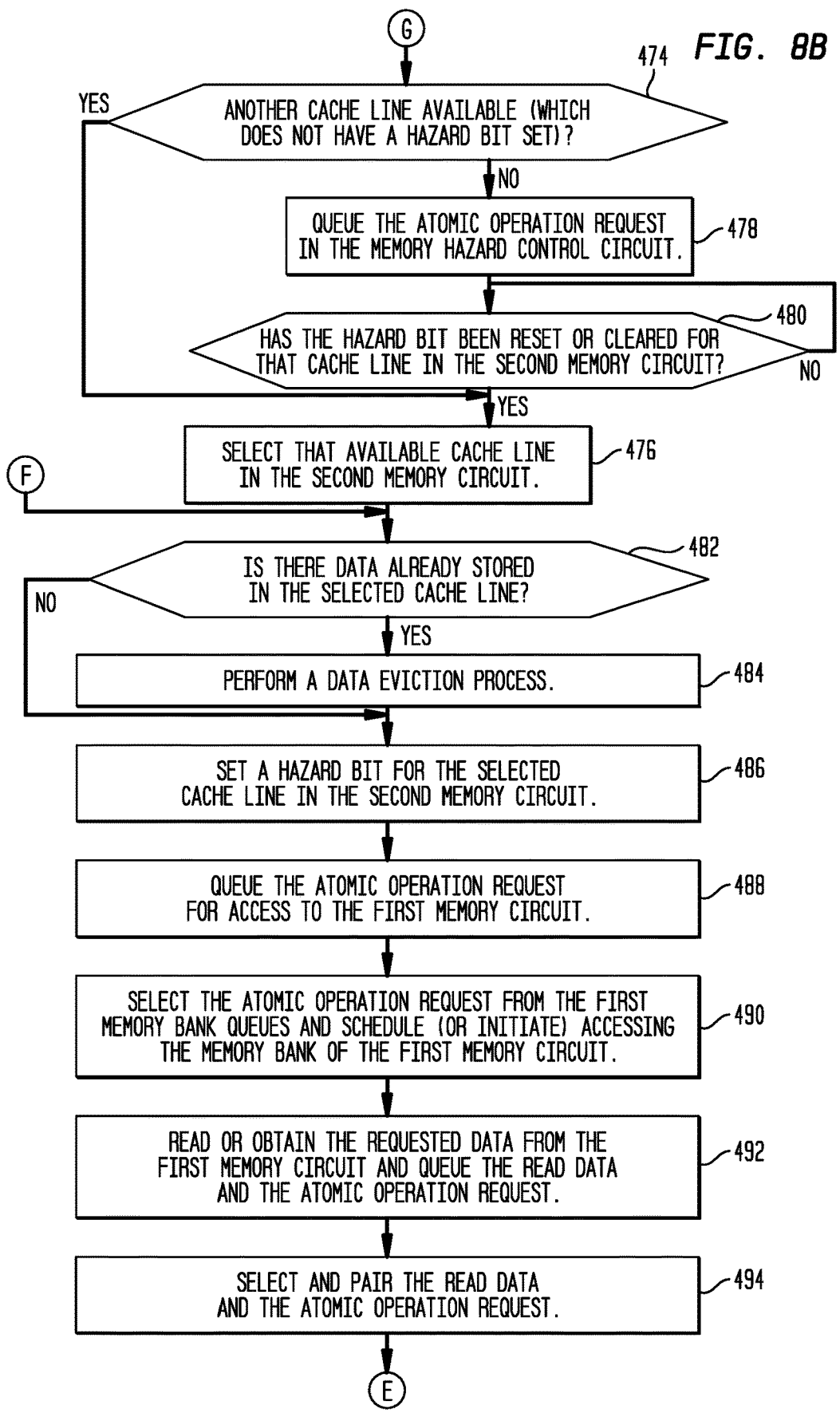
Figure 8C:
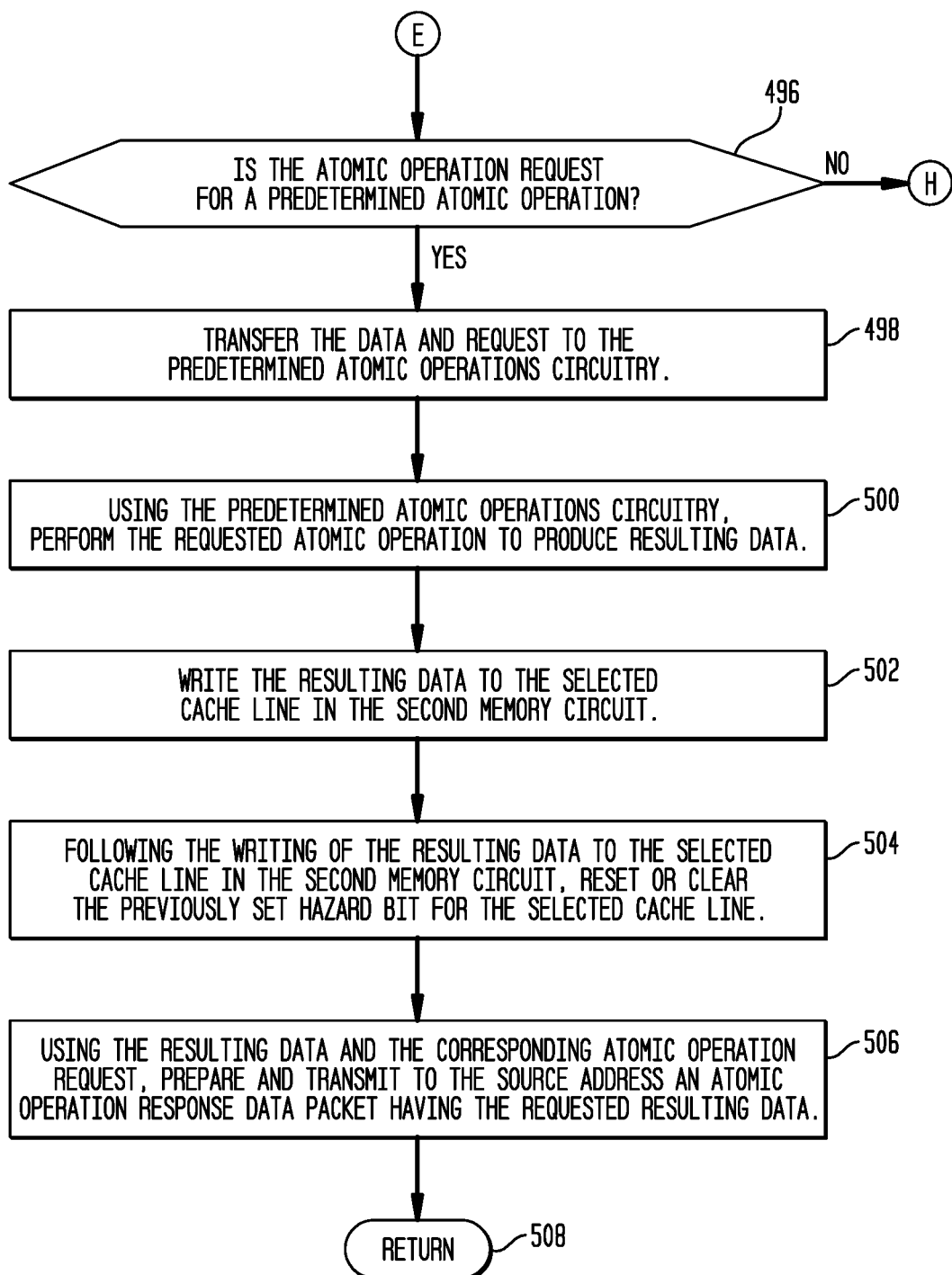
Figure 8D:
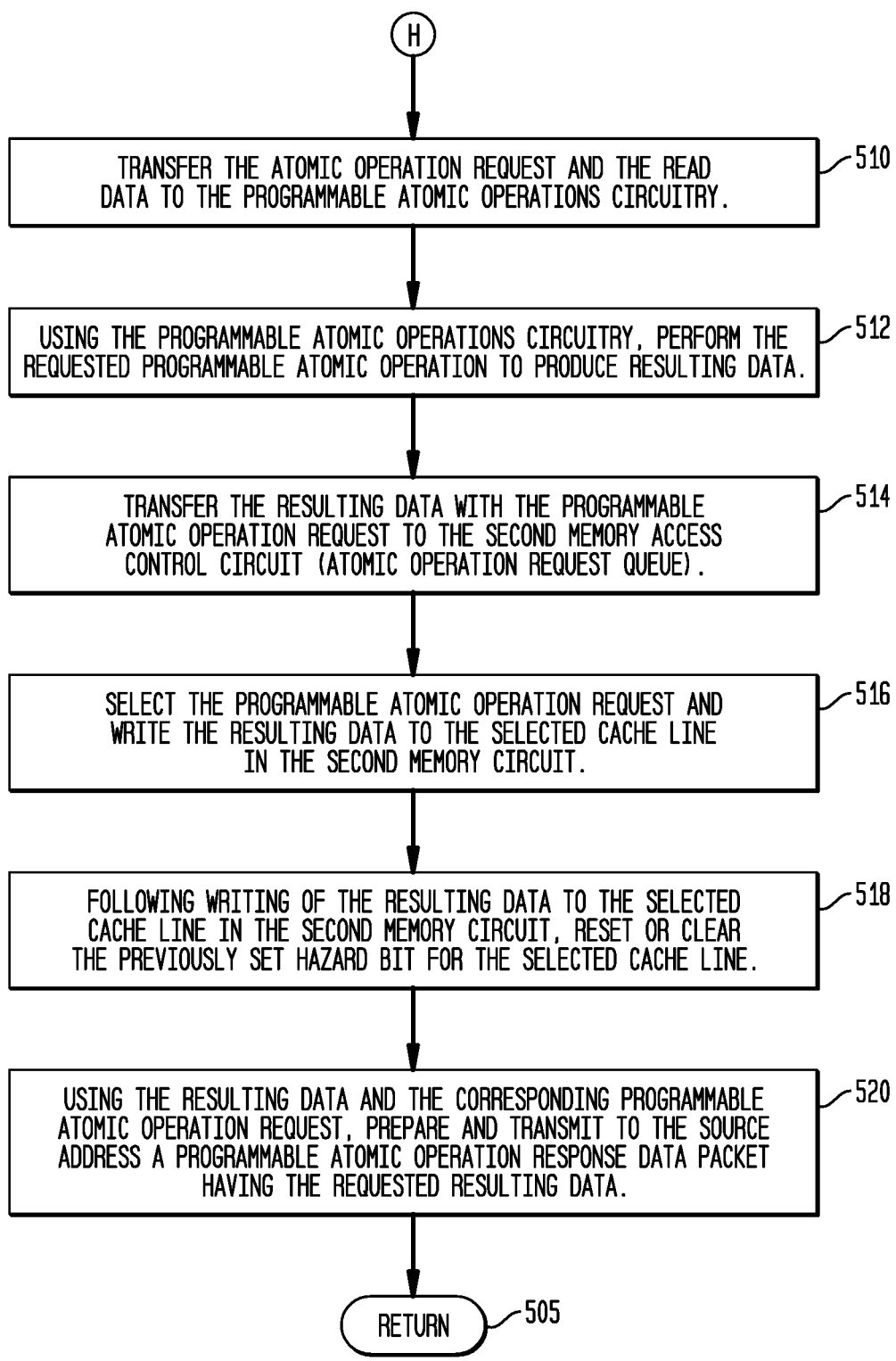
Figure 10:
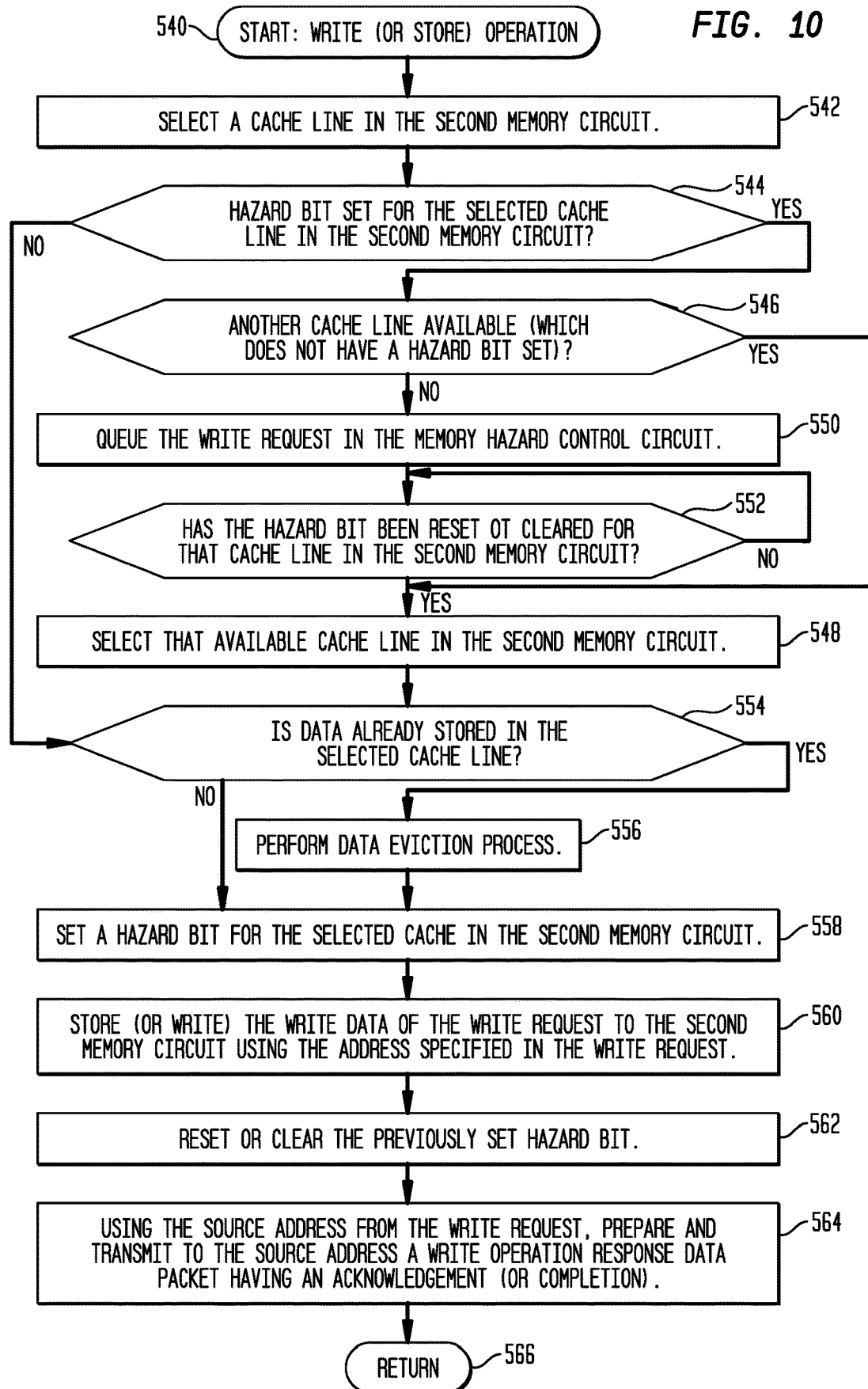
FIG. 10 is a flow chart of a representative method of performing a write or store request.

FIGS. 7A, 7B and 7C (collectively referred to as FIG. 7) are flow charts of a representative method of receiving and decoding of a request and performing a read or load request, with FIGS. 7A and 7B showing a representative method of receiving and decoding of a request and of performing a read or load request from a first memory circuit, and FIG. 7C showing a representative method of performing a read or load request from a second memory circuit. FIGS. 8A, 8B, 8C, and 8D are flow charts showing a representative method of performing an atomic operation as part of an atomic operation request. FIG. 9 is a flow chart showing a representative method of performing a data eviction from the second memory circuit as part of a read (or load) request or as part of a write (or store) request. FIG. 10 is a flow chart of representative method of performing a write or store request.

As mentioned above, the first and/or second memory controller circuits 100, 100A may receive a memory read (or load) request or a memory write (or store) request transmitted from the communication network 150. Table 2 shows a list of example read, write and atomic operations, and corresponding requests, in a representative embodiment (with " . . . " indicating that the requests for other operations may be specified using the immediately preceding request type and pattern, e.g., an AmoXor request for a Fetch-and-XOR atomic operation, an AmoAnd request for a Fetch-and-AND atomic operation, for example and without limitation).

TABLE 2

| Request Name | Description |
|---|---|
| Read8 | Read 8 bytes from memory |
| Read16 | Read 16 bytes from memory |
| Read24 | Read 24 bytes from memory |
| Read32 | Read 32 bytes from memory |
| Read40 | Read 40 bytes from memory |
| Read48 | Read 48 bytes from memory |
| Read56 | Read 56 bytes from memory |
| Read64 | Read 64 bytes from memory |
| Write8 | Write 8 bytes to memory |
| Write16 | Write 16 bytes to memory |
| Write24 | Write 24 bytes to memory |
| Write32 | Write 32 bytes to memory |
| Write40 | Write 40 bytes to memory |
| Write48 | Write 48 bytes to memory |
| Write56 | Write 56 bytes to memory |
| Write64 | Write 64 bytes to memory |
| AmoAddW | Predetermined Atomic 4-byte add at memory |
| AmoAddD | Predetermined Atomic 8-byte add at memory |
| . . . | Other Predetermined Atomic Operations (Table 1) |
| AmoCust0A0 | Custom (Programmable) Atomic #0 with no request arguments |
| AmoCust0A1 | Custom (Programmable) Atomic #0 with one 8-byte request argument |
| AmoCust0A2 | Custom (Programmable) Atomic #0 with two 8-byte request arguments |
| AmoCust0A4 | Custom (Programmable) Atomic #0 with four 8-byte request arguments |
| . . . | Custom (Programmable) Atomics #1-6 |
| AmoCust7A0 | Custom (Programmable) Atomic #7 with no request arguments |
| AmoCust7A1 | Custom (Programmable) Atomic #7 with one 8-byte request argument |
| AmoCust7A2 | Custom (Programmable) Atomic #7 with two 8-byte request arguments |
| AmoCust7A4 | Custom (Programmable) Atomic #7 with four 8-byte request arguments |

Table 3 shows a list of example responses from the first and/or second memory controller circuits 100, 100A to read, write and atomic requests, which responses are transmitted as data packets over the communication network 150, in a representative embodiment.

TABLE 3

| Response Name | Description |
|---|---|
| Data8 | Data response, 8-byte from memory |
| Data16 | Data response, 16-byte from memory |
| Data24 | Data response, 24-byte from memory |
| Data32 | Data response, 32-byte from memory |
| Data40 | Data response, 40-byte from memory |
| Data48 | Data response, 48-byte from memory |
| Data56 | Data response, 56-byte from memory |
| Data64 | Data response, 64-byte from memory |
| Comp | Completion (e.g., acknowledgement (ACK)) response from memory |

It should be noted that the source entity or device, i.e., the entity or device issuing the read or write request, such as the various processors (e.g., processor 110), hybrid threading processor(s) 115, configurable processing circuit(s) 105, generally will not have any information and does not require any information concerning whether the requested read data or requested write data is or will be held in the first memory circuit 125 or the second memory circuit 175, and simply may generate a read or write request to memory and transmit the request over the communication network 150 to the first and/or second memory controller circuits 100, 100A.

Referring to FIG. 7, the representative method of performing a representative method of receiving and decoding of a request and performing a read or load request, begins with the reception of a request (e.g., a request from Table 2) by the first and/or second memory controller circuits 100, 100A, start step 400. Using the packet decoder circuit 215, the received request is decoded, the type of request is determined (read, write, atomic operation), and the request is placed in a corresponding queue (network request queue 250 or atomic operation request queue 255), step 402. In another representative embodiment, if a packet decoder circuit 215 is not included, then the request is placed in a single request queue (a combined network request queue 250 and atomic operation request queue 255), and the steps of decoding the received request and determining the type of request, of step 402 is performed by the second memory access control circuit 225. A request is selected from the queue by the inbound request multiplexer 245, step 404, and when the request is a read request, step 406, the second memory access control circuit 225 determines whether the requested data is stored in the second memory circuit 175, step 408. When the request is not a read request (in step 408), the second memory access control circuit 225 determines whether it is a write request, step 410, and if so, proceeds with step 540 illustrated and discussed with reference to FIG. 10. When the received request is neither a read request nor a write request from the network request queue 250, it is an atomic operation request from the atomic operation queue 255, and the second memory access control circuit 225 proceeds with step 456 illustrated and discussed with reference to FIG. 8.

It should be noted that these steps 400, 402, 404, and 406 or 410 are generally applicable to all read, write, and/or atomic operations, not just the read operation illustrated in FIG. 7. For a write (or store) operation, the method will have completed steps 400, 402, 404, and 410, and will have determined that the request selected from the network request queue 250 is a write request. It should be noted that steps 406 and 410, determining whether the request is a read request or a write request, may occur in any order; as a consequence, completion of step 406 is not required for the commencement of a write operation. Similarly, the determination as to whether the request is an atomic operation request may occur as a separate step (not illustrated), and not merely by a process of elimination that the request is not a read request and is not a write request. In addition, only two of the steps of determining whether the request is a read request, a write request, or an atomic operation request is required, with any third type of request automatically determined by elimination, that it is not a first type of request and is not a second type of request. All such variations are considered equivalent and within the scope of the disclosure.

When the second memory access control circuit 225 has determined (in step 408) that the requested data is not stored in the second memory circuit 175, the second memory access control circuit 225 selects a cache line in the second memory circuit 175, step 411, and, using the memory hazard control circuit 230, determines whether that particular cache line in the second memory circuit 175 has a hazard bit set in the memory hazard registers 260, step 412. If the hazard bit is set for that cache line in the second memory circuit 175, the second memory access control circuit 225 determines whether another cache line is available (which does not have a hazard bit set), step 414, and if so, selects that available cache line in the second memory circuit 175, step 416. If there are no cache lines in the second memory circuit 175 which are available, i.e., all of the cache lines have a hazard bit set, the second memory access control circuit 225 queues the read request in the memory hazard control circuit 230, step 418, until a hazard bit has been reset or cleared for a cache line in the second memory circuit 175, step 420, and the second memory access control circuit 225 selects that cache line with the reset or cleared hazard bit, returning to step 416.

When a cache line in the second memory circuit 175 is selected, in either step 411 or step 416, the second memory access control circuit 225 determines whether there is data already stored in the selected cache line, step 422, and if there is data in that cache line, performs a data eviction process, step 423 (i.e., performs steps 522-534 for a data eviction from the second memory circuit 175, illustrated and discussed with reference to FIG. 9).

When the selected cache line either had no data already stored (step 422) or the data eviction process has completed (step 423), the second memory access control circuit 225 generates a signal to the memory hazard control circuit 230 to set a hazard bit for the selected cache line in the second memory circuit 175, step 424, to block other requests from accessing the same cache line, as the data in that cache line will be in the process of transitioning and another read or write process should not access it, providing memory coherency.

As there was a cache "miss", the second memory access control circuit 225 then transfers the read request to the optional delay circuit 235 (to match the amount of time taken by the second memory access control circuit 225 to access the second memory circuit 175 and determine a cache miss) (or as another option, transfers the request directly to the inbound control multiplexer 240), so that the request will then be selected by the inbound control multiplexer 240 and stored in the first memory bank queues 265, to queue the read request for access to the first memory circuit 125, step 426. The scheduler circuit 270 eventually selects the read request from the first memory bank queues 265 and schedules (or initiates) accessing the memory bank of the first memory circuit 125, step 428. The requested data from the first memory circuit 125 is read or obtained and is provided to the second memory "miss" data queue 290, and the corresponding request (or request data, such as source address) is provided to the second memory "miss" request queue 285, step 430. Using the data selection multiplexer 310 and the request selection multiplexer 305, the read data and the corresponding request are selected and paired together using the write merge circuit 180, step 432, with the write merge circuit 180 then writes the read data to the selected cache line in the second memory circuit 175 (via communication line 236) (or, equivalently, to the second memory access control circuit 225 to write to the second memory circuit 175), step 434. As used herein, "pairing" together of the read data and the corresponding request simply means selecting them together or matching them together, using the data selection multiplexer 310 and the request selection multiplexer 305, such that both the data and the request can be utilized together or concurrently, such as for an atomic operation or to prepare an outgoing response data packet, for example (i.e., to avoid read data from being paired with the wrong request and being sent in error to the source of the wrong request). With the writing of the read data to the selected cache line in the second memory circuit 175, the previously set hazard bit is reset or cleared for the selected cache line, step 436. Using the read data and the corresponding request, a read response data packet (e.g., a response from Table 3) having the requested read data is prepared and transmitted to the source address, generally over the communication network 150, step 438, and the read operation from the first memory circuit 125 may end, return step 440.

When the second memory access control circuit 225 has determined (in step 408) that the requested data is stored in a cache line in the second memory circuit 175, i.e., a cache hit, using the memory hazard control circuit 230, the second memory access control circuit 225 determines whether that particular cache line in the second memory circuit 175 has a hazard bit set in the memory hazard registers 260, step 442. If the hazard bit is set for that cache line in the second memory circuit 175, the second memory access control circuit 225 queues the read request in the memory hazard control circuit 230, step 444, until a hazard bit has been reset or cleared for that cache line in the second memory circuit 175, step 446.

When either there is no hazard bit currently set, following either step 442 or step 446, the second memory access control circuit 225 reads or obtains the requested data from that cache line and transfers it directly to the second memory "hit" data queue 295, step 448. As part of step 448, as there was a cache "hit", the second memory access control circuit 225 then transfers the read request to the optional delay circuit 235 (to match the amount of time taken by the second memory access control circuit 225 to access the second memory circuit 175 and obtain the data) and the corresponding request (or request data, such as source address) is provided to the second memory "hit" request queue 280. Using the data selection multiplexer 310 and the request selection multiplexer 305, the read data and the corresponding request are selected and paired together, step 450. Using the read data and the corresponding request, a read response data packet (e.g., a response from Table 3) having the requested read data is prepared and transmitted to the source address, generally over the communication network 150, step 452, and the read operation from the second memory circuit 175 may end, return step 454.

As mentioned above, for any read operation or predetermined atomic operation, from either the first memory circuit 125 or the second memory circuit 175, there are several options available for preparing and transmitting the read response data packet, such as: (1) using the write merge circuit 180 to provide the read data and the corresponding request to the outbound response multiplexer 315, for selection and provision to the network communication interface 170, to encode and prepare a response or return data packet for transmission on the communication network 150; or (2) optionally, using the write merge circuit 180, providing the read data and the corresponding request to the network communication interface 170, to encode and prepare a response or return data packet for transmission on the communication network 150; or (3) as another option, the outbound response multiplexer 315 may receive and select the read data directly from the data selection multiplexer 310 and the request data directly from the request selection multiplexer 305, for provision to the network communication interface 170, to encode and prepare a response or return data packet for transmission on the communication network 150.

As mentioned above, the incoming request to the first and/or second memory controller circuits 100, 100A may be for an atomic operation, which is essentially a read request to obtain the operand data, followed by an atomic operation on the operand date, followed by a write request to save the resulting data to memory. The read operation portion of the atomic operation request generally tracks the read operation previously discussed, with the additional step of setting a hazard bit for the selected cache line of the second memory circuit 175, through step 432 for a cache miss or through step 450 for a cache hit, i.e., through obtaining the data from either the first memory circuit 125 or the second memory circuit 175 and providing the data and request into the corresponding queues 280, 285, 290, 295. For purposes of clarity, these steps are also discussed below.

Referring to FIG. 8, following step 410, when the request is an atomic operation request, the second memory access control circuit 225 determines whether the requested operand data is stored in the second memory circuit 175, step 456. When the second memory access control circuit 225 has determined (in step 456) that the requested data is stored in a cache line in the second memory circuit 175, i.e., a cache hit, using the memory hazard control circuit 230, the second memory access control circuit 225 determines whether that particular cache line in the second memory circuit 175 has a hazard bit set in the memory hazard registers 260, step 458. If the hazard bit is set for that cache line in the second memory circuit 175, the second memory access control circuit 225 queues the atomic operation request in the memory hazard control circuit 230, step 460, until a hazard bit has been reset or cleared for that cache line in the second memory circuit 175, step 462.

When either there is no hazard bit currently set, following either step 458 or step 462, the second memory access control circuit 225 sets the hazard bit for that cache line in the second memory circuit 175 (as that data will be updated following the atomic operation), step 464, obtains the requested data from that cache line and transfers it directly to the second memory "hit" data queue 295, step 466, performing the "fetch" portion of the atomic operation (e.g., of a Fetch-and-AND or of Fetch-and-Swap (Exchange), for example). As part of step 466, as there was a cache "hit", the second memory access control circuit 225 then transfers the atomic operation request to the optional delay circuit 235 (to match the amount of time taken by the second memory access control circuit 225 to access the second memory circuit 175 and obtain the data) and the corresponding request (or request data, such as source address) is provided to the second memory "hit" request queue 280. Using the data selection multiplexer 310 and the request selection multiplexer 305, the read operand data and the corresponding atomic operation request are selected and paired together, step 468.

When the second memory access control circuit 225 has determined (in step 456) that the requested data is not stored in the second memory circuit 175, the second memory access control circuit 225 selects a cache line in the second memory circuit 175, step 470, and, using the memory hazard control circuit 230, determines whether that particular cache line in the second memory circuit 175 has a hazard bit set in the memory hazard registers 260, step 472. If the hazard bit is set for that cache line in the second memory circuit 175, the second memory access control circuit 225 determines whether another cache line is available (which does not have a hazard bit set), step 474, and if so, selects that available cache line in the second memory circuit 175, step 476. If there are no cache lines in the second memory circuit 175 which are available, i.e., all of the cache lines have a hazard bit set, the second memory access control circuit 225 queues the atomic operation request in the memory hazard control circuit 230, step 478, until a hazard bit has been reset or cleared for a cache line in the second memory circuit 175, step 480, and the second memory access control circuit 225 selects that cache line with the reset or cleared hazard bit, returning to step 476.

When a cache line in the second memory circuit 175 is selected, in either step 470 or step 476, the second memory access control circuit 225 determines whether there is data already stored in the selected cache line, step 482, and if there is data in that cache line, performs a data eviction process, step 484 (i.e., performs steps 522-534 for a data eviction from the second memory circuit 175, illustrated and discussed with reference to FIG. 9).

When the selected cache line either had no data already stored (step 482) or the data eviction process has completed (step 484), the second memory access control circuit 225 generates a signal to the memory hazard control circuit 230 to set a hazard bit for the selected cache line in the second memory circuit 175, step 486, to block other requests from accessing the same cache line, as the data in that cache line will be in the process of transitioning and another read or write process should not access it, providing memory coherency.

As there was a cache "miss", the second memory access control circuit 225 then transfers the atomic operation request to the optional delay circuit 235 (to match the amount of time taken by the second memory access control circuit 225 to access the second memory circuit 175 and determine a cache miss) (or as another option, transfers the request directly to the inbound control multiplexer 240), so that the request will then be selected by the inbound control multiplexer 240 and stored in the first memory bank queues 265, to queue the atomic operation request for access to the first memory circuit 125, step 488. The scheduler circuit 270 eventually selects the atomic operation request from the first memory bank queues 265 and schedules (or initiates) accessing the memory bank of the first memory circuit 125, step 490. The requested data from the first memory circuit 125 is obtained (read) and is provided to the second memory "miss" data queue 290, and the corresponding atomic operation request (including request data, such as source address) is provided to the second memory "miss" request queue 285, step 492, performing the "fetch" portion of the atomic operation. Using the data selection multiplexer 310 and the request selection multiplexer 305, the read data and the corresponding request are selected and paired together, step 494.

At this point for processing an atomic operation request, following step 468 or step 494, there is an available cache line in the second memory circuit 175 which has been reserved (e.g., hazard bit set), operand data has been read (obtained) from either the second memory circuit 175 or the first memory circuit 125, and the read data has been paired or matched to its corresponding atomic operation request. When the atomic operation request is for a predetermined atomic operation, step 496, the data selection multiplexer 310 and the request selection multiplexer 305 transfer the data and request to the predetermined atomic operations circuitry 185, step 498, and the predetermined atomic operations circuitry 185 performs the requested atomic operation to produce resulting data, step 500, e.g., Fetch-and-AND, Fetch-and-OR, Fetch-and-XOR, Fetch-and-Add, Fetch-and-Subtract, Fetch-and-Increment, Fetch-and-Decrement, Fetch-and-Minimum, Fetch-and-Maximum, Fetch-and-Swap (Exchange), Compare-and-Swap. Using the write merge circuit 180, the resulting data is written to the selected cache line in the second memory circuit 175 (via communication line 236) (or, equivalently, to the second memory access control circuit 225 to write to the second memory circuit 175), step 502. With the writing of the resulting data to the selected cache line in the second memory circuit 175, the previously set hazard bit is reset or cleared for the selected cache line, step 504, using the memory hazard clear (reset) circuit 190 or the memory hazard control circuit 230. Using the resulting data and the corresponding atomic operation request, an atomic operation response data packet (e.g., a response from Table 3) having the requested resulting data is prepared and transmitted by the network communication interface 170 to the source address (provided in the request), generally over the communication network 150, step 506, and the predetermined atomic operation may end, return step 508.

When the atomic operation request is not for a predetermined atomic operation in step 496, i.e., is for a programmable or custom atomic operation, the atomic operation request and the read data are transferred, as part of a "work descriptor" discussed in greater detail below, to the programmable atomic operations circuitry 135, step 510, either over communication line or bus 60 to the processor 110A or over communication line or bus 60A to the programmable atomic operations circuitry 135 within the atomic and merge operation circuits 165. The programmable atomic operations circuitry 135 performs the requested programmable atomic operation to produce resulting data, step 512, as discussed in greater detail below, and transfers the resulting data with the programmable atomic operation request to the atomic operation request queue 255, step 514. Using the inbound request multiplexer 245 to select the programmable atomic operation request, and using second memory access control circuit 225, the resulting data is written to the selected cache line in the second memory circuit 175, essentially as a write operation, step 516. With the writing of the resulting data to the selected cache line in the second memory circuit 175, the previously set hazard bit is reset or cleared for the selected cache line, step 518, using memory hazard clear (reset) circuit 190 or memory hazard control circuit 230. Using the resulting data and the corresponding programmable atomic operation request, a programmable atomic operation response data packet (e.g., a response from Table 3) having the requested resulting data is prepared and transmitted to the source address, generally over the communication network 150, step 520, and the programmable atomic operation may end, return step 505.

There are several ways in which the programmable atomic operation response data packet may be prepared and transmitted. For example, when the programmable atomic operations circuitry 135 is included within the atomic and merge operation circuits 165, the programmable atomic operation response data packet may be prepared and transmitted the same way any other response packet is prepared and transmitted, as described above (e.g., using the packet encoder 220 of the network communication interface 170, and so on). Alternatively, when the programmable atomic operations circuitry 135 is included within the processor 110A, the programmable atomic operation response data packet may be prepared and transmitted directly by the processor 110A, which also generally has a similar or identical network communication interface 170.

As indicated above, the data currently held in a selected cache line in the second memory circuit 175 may have to be transferred to the first memory circuit 125, to preserve and continue to store the currently held data and to allow the selected cache line in the second memory circuit 175 to be utilized for other data, a process referred to herein as a data "eviction" (and is used in step 423 (read operation), step 484 (atomic operation), or step 556 (write (or store) request) (illustrated and discussed with reference to FIG. 10)). Referring to FIG. 9, following step 422 (read operation), or step 482 (atomic operation), or step 554 (write (or store) request), the data eviction process begins, start step 522, and the second memory access control circuit 225 generates a signal to the memory hazard control circuit 230 to set a hazard bit (in registers 260) for the selected cache line in the second memory circuit 175, step 524, to block other requests from accessing the same cache line, as the data in that cache line will be in the process of transitioning to the replacement data. The second memory access control circuit 225 reads the current data from the selected cache line in the second memory circuit 175, and with its corresponding memory address, step 526, queues the evicted data and memory address (effectively as or equivalently to a write request) for writing (storing) to the first memory circuit 125, step 528, e.g., transfers the current read data and memory address to the inbound control multiplexer 240, so that the data and request (with memory address) will then be selected by the inbound control multiplexer 240 and stored in the first memory bank queues 265. The scheduler circuit 270 eventually selects the evicted data and memory address from the first memory bank queues 265 and schedules (or initiates) accessing the memory bank of the first memory circuit 125, step 530. The evicted data is stored to the first memory circuit 125 at the specified memory address, step 532, and the memory hazard control circuit 230 (or the memory hazard clear (reset) circuit 190) resets or clears the hazard bit (in registers 260) for the selected cache line in the second memory circuit 175, step 534. The data eviction process may end, return step 536, and the selected cache line in the second memory circuit 175 may then be overwritten, without any loss of the previous data, which is now stored in the first memory circuit 125. Following step 534 or 536, upon clearing or resetting of the hazard bit, the process which which required the data eviction process may resume (e.g., proceeding to step 424 for a reading (or loading) process, proceeding to step 558 for a writing process, or proceeding to step 486 for an atomic operation process).

As mentioned above, the steps 400, 402, 404, 406, and 410 discussed above are generally applicable to all read, write, and/or atomic operations, not just the read operation illustrated in FIG. 7. Referring to FIG. 10, for a write (or store) operation, the method will have completed steps 400, 402, 404, and 410, and will have determined that the request selected from the network request queue 250 is a write request. It should be noted that steps 406 and 410, determining whether the request is a read request or a write request, may occur in any order; as a consequence, completion of step 406 is not required for the commencement of a write operation. Also as mentioned above, any determination that the request is a write request (as a third type of request) may also occur through a process of elimination or by default, i.e., a determination that it is not a first type of request (read) and is not a second type of request (atomic operation).

Referring to FIG. 10, having previously determined that the request is a write request for performance of a write (or store) operation, the write (or store) operation begins, start step 540, and the second memory access control circuit 225 selects a cache line in the second memory circuit 175, step 542, and using the memory hazard control circuit 230, determines whether that particular cache line in the second memory circuit 175 has a hazard bit set in the memory hazard registers 260, step 544. If the hazard bit is set for that cache line in the second memory circuit 175, the second memory access control circuit 225 determines whether another cache line is available (which does not have a hazard bit set), step 546, and if so, selects that available cache line in the second memory circuit 175, step 548. If there are no cache lines in the second memory circuit 175 which are available, i.e., all of the cache lines have a hazard bit set, the second memory access control circuit 225 queues the write request in the memory hazard control circuit 230, step 550, until a hazard bit has been reset or cleared for a cache line in the second memory circuit 175, step 552, and the second memory access control circuit 225 proceeds to step 548 to select that cache line with the reset or cleared hazard bit.

When a cache line in the second memory circuit 175 is selected, in either step 542 or step 548, the second memory access control circuit 225 determines whether there is data already stored in the selected cache line, step 554, and if there is data in that cache line, performs a data eviction process, step 556 (i.e., performs steps 522-534 for a data eviction from the second memory circuit 175, illustrated and discussed with reference to FIG. 9.

When the selected cache line either had no data already stored (step 554) or the data eviction process has completed (step 556), the second memory access control circuit 225 generates a signal to the memory hazard control circuit 230 to set a hazard bit for the selected cache line in the second memory circuit 175, step 558, to block other requests from accessing the same cache line, as the data in that cache line will be in the process of transitioning and another read or write process should not access it, providing memory coherency.

The write data of the write request is then written to (stored in) the second memory circuit 175, using the address specified in the write request, step 560, and the previously set hazard bit is reset or cleared, step 562. These steps of writing to the second memory circuit 175 and clearing the hazard bit may occur in any of several ways, for example: (1) using the second memory access control circuit 225 to store the write data in the second memory circuit 175 and generate a signal to the memory hazard control circuit 230 to reset or clear the hazard bit for the selected cache line in the second memory circuit 175; or (2) routing the request through the second memory "hit" request queue 280 and routing the write data to the second memory "hit" data queue 295, followed by using the write merge circuit 180 to write the write data to the selected cache line in the second memory circuit 175 (via communication line 236), and to generate a signal to the memory hazard control circuit 230 to reset or clear the hazard bit for the selected cache line in the second memory circuit 175. Using the source address from the write request, a write operation response data packet having an acknowledgement (or completion) is prepared and transmitted to the source address, generally over the communication network 150, step 564, and the write operation may end, return step 566. Any of the methods and components mentioned previously may be utilized to prepare and transmit the response data packet.

As a result, the second memory circuit 175 will store the most recent data written to the second memory circuit 175, until that data may be subsequently "evicted" and moved or re-stored in the first memory circuit 125. As that most recent data may be utilized again comparatively promptly, storing the data in the second memory circuit 175 also serves to reduce latency.

Applications that are solved using parallel threads of execution often have regions of memory where multiple threads may try to modify the contents. To obtain the correct results, the operations from the multiple threads must be performed one at a time. Many operations required by an application are complex enough that the set of predetermined or built in atomic operations are not sufficient. These more complex operations perform a sequence of instructions that include setting a memory lock, performing the operation, then clearing the memory lock. In the prior art, this sequence of operations accesses memory multiple times and has the potential for processor threads to have to poll while waiting for a memory lock to be cleared.

In accordance with the representative embodiments, the user defined, programmable atomic operations allow a user to define an atomic operation that is of value to a single application. The user-defined atomic operation is performed by execution of a single processor instruction.

In accordance with the representative embodiments, a user may create a set of programmable atomic operation instructions that allow an application to issue user defined atomic operations to the memory controller circuit 100, 100A. The atomic operations are issued similar to predetermined atomic operations. The programmable atomic operation request includes a physical memory address, a programmable atomic operation identifier and typically some number of thread state register values. The memory controller circuit 100, 100A receives the programmable atomic operation request, the second memory control circuit 160 places a hazard (sets a hazard bit) on the target cache line of the second memory circuit 175, and then passes the programmable atomic operation request information to the programmable atomic operations circuitry 135 within or coupled to the memory controller circuit 100, 100A. The programmable atomic operations circuitry 135 initializes its register state from the provided programmable atomic operation request information (including memory address, 64-bit memory value located at the memory address, and the thread state registers). The programmable atomic operations circuitry 135 executes a series or instructions to perform the programmable atomic operation. Results of the programmable atomic operation are stored back to the target memory line or the second memory circuit 175 and possibly returned to the requesting source or processor in a response packet.

The requesting source or processor generally informs the system 50, 50A through a system call that a programmable atomic operation is required. The operating system processes the system call by loading the provided set of instructions in the memory associated with the programmable atomic operations circuitry 135.

The programmable atomic operations circuitry 135 begins executing a user-defined, programmable atomic operation by executing the loaded instructions starting at a location obtained from the programmable atomic operation atomic identifier in the programmable atomic operation request packet.

The programmable atomic operations circuitry 135 forces all memory requests to the memory line of the second memory circuit 175 covered by the hazard bit originally set by the second memory control circuit 160 upon receipt of the atomic operation. Additionally, the programmable atomic operations circuitry 135 should limit the number of instructions for execution to a finite number to ensure that the programmable atomic operation completes. The programmable atomic operations circuitry 135 also detects accesses to out of bounds memory lines and execution of too many instructions, and responds back to the requesting source or processor with a failure status. The requesting source or processor would then issue a trap to notify the system of the failure.

In representative embodiments, example programmable atomic operation instructions have representative formats as shown in Table 4, for example.

TABLE 4

| 31 27 | 26 | 25 | 24 20 | 19 15 | 14 12 | 11 7 | 6 0 | |
|---|---|---|---|---|---|---|---|---|
| 10000 | aq | rl | 00000 | 00000 | ac | 00000 | 0101110 | AMOCUST0 |
| 10001 | aq | rl | 00000 | 00000 | ac | 00000 | 0101110 | AMOCUST1 |
| 10010 | aq | rl | 00000 | 00000 | ac | 00000 | 0101110 | AMOCUST2 |
| 10011 | aq | rl | 00000 | 00000 | ac | 00000 | 0101110 | AMOCUST3 |
| 10100 | aq | rl | 00000 | 00000 | ac | 00000 | 0101110 | AMOCUST4 |
| 10101 | aq | rl | 00000 | 00000 | ac | 00000 | 0101110 | AMOCUST5 |
| 10110 | aq | rl | 00000 | 00000 | ac | 00000 | 0101110 | AMOCUST6 |
| 10111 | aq | rl | 00000 | 00000 | ac | 00000 | 0101110 | AMOCUST7 |

Referring again to programmable atomic memory operations performed by the programmable atomic operations circuitry 135, in a representative embodiment, the programmable atomic operations circuitry 135 is based on a RISC-V processor ISA with modifications to efficiently perform programmable atomic memory operations. These modifications allow programmable atomic operations circuitry 135 or other processor 110, 110A, or HTP 115, such as a RISC-V processor, to create threads on the fly, access the minimal amount of data from memory to perform an atomic operation, clear the memory hazard bit (lock) when the atomic operation is complete, and terminate the previously created thread with the option of sending a response packet over the communication network 150.

The modifications include barrel style instruction processing across multiple threads. Barrel processing allows the programmable atomic operations circuitry 135 or other processor 110, 110A to hide memory access latencies by switching to other ready-to-execute threads. Barrel processing results in the overall time for a single atomic operation to increase, however this style of processing greatly increases atomic operation throughput. This tradeoff is appropriate for an application that must perform custom atomic operations across a large number of memory locations. An application that performs atomic operations on a single memory location (such as a counting barrier operation) could use a predetermined atomic operation. For this situation, the memory location will be cached in the second memory circuit 175 and the memory hazard bit (lock) will be set for a comparatively minimal amount of time.

The programmable atomic operations circuitry 135 or other processors 110, 110A have a set of read/write memory buffers per thread. The memory buffers allow read prefetching and write coalescing to minimize accesses to the first and second memory circuits 125, 175. The RISC-V architecture supports this style of memory interface with acquire/release instruction functionality.

In a representative embodiment, the programmable atomic operations circuitry 135 is embodied in an HTP 115, as mentioned above, described in greater detail in described in U.S. patent application Ser. No. 16/176,434. For such an embodiment, the HTP 115 is utilized as a processor 110A, and is also provided with a direct communication link (or line) 60 to and from the second memory controller circuit 100A.

Figure 11:
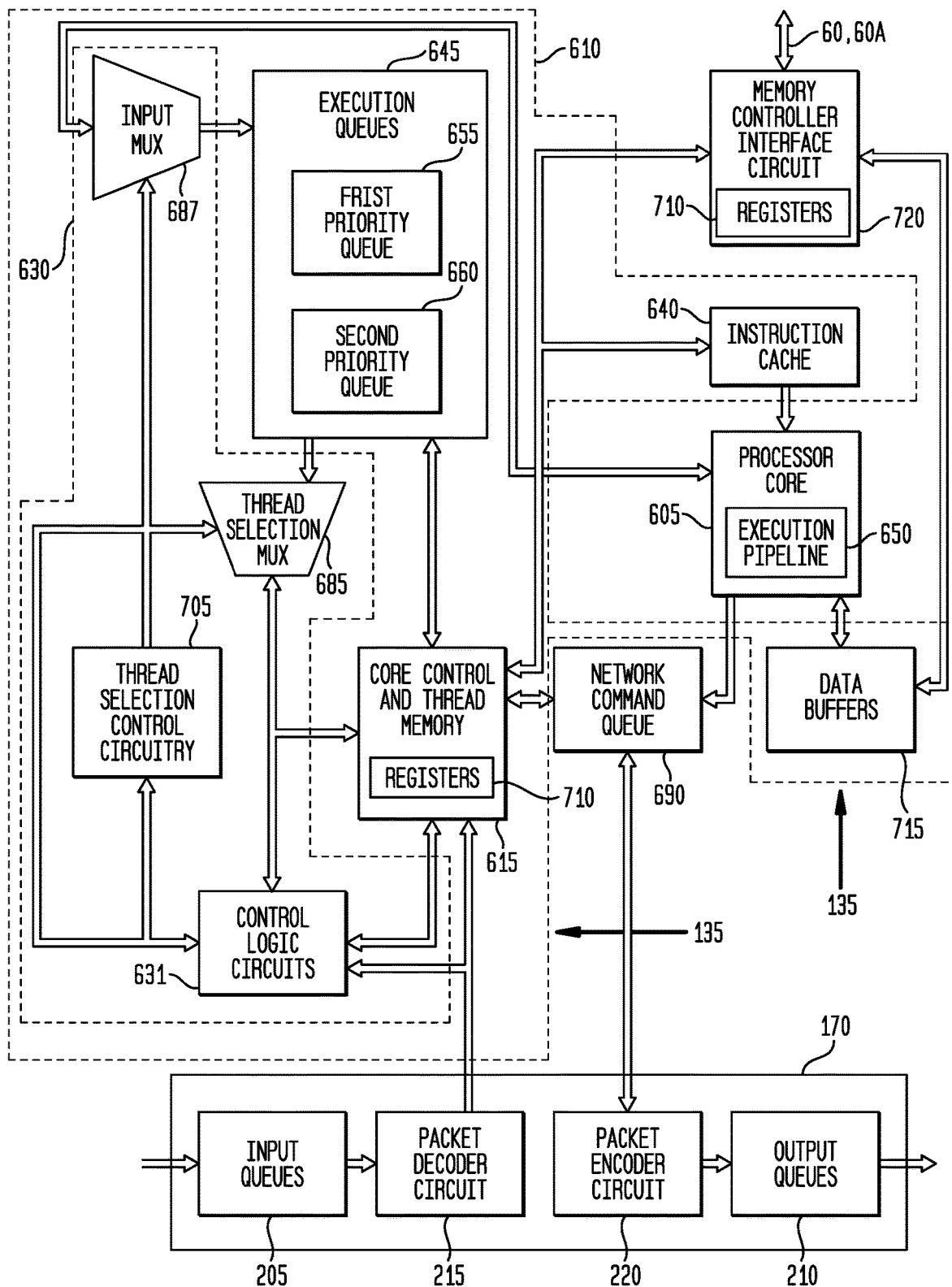
FIG. 11 is a block diagram of a representative programmable atomic operations circuitry embodiment.

FIG. 11 is a block diagram of a representative programmable atomic operations circuitry 135 (or other processor 110, 110A) embodiment, including when such programmable atomic operations circuitry 135 may be included in an HTP 115. For ease of illustration and discussion, it should be noted that not all registers of a thread memory and a network response memory of an HTP 115 are illustrated in FIG. 11. Referring to FIG. 11, the programmable atomic operations circuitry 135 comprises a memory controller interface circuit 720, core control circuitry 610, and one or more processor cores 605.

The memory controller interface circuit 720 manages communication between the programmable atomic operations circuitry 135 and either the balance of the first memory controller circuit 100 or the separate second memory controller circuit 100A, such as (1) providing the programmable atomic operation request and read data to control logic and thread selection circuitry 630, core control and thread memory 615, and/or data buffers 715 of the programmable atomic operations circuitry 135; and (2) providing the resulting data generated upon completion of the programmable atomic operation by the processor core 605 together with the programmable atomic operation request data to the atomic operation request queue to store the resulting data in the second memory circuit 175.

The core control circuitry 610 comprises control logic and thread selection circuitry 630 (to manage threads for the corresponding instructions that execute on the processor core 605), an instruction cache 640 storing instructions to perform the programmable atomic operation, and various types of memory and registers, including an execution queue 645, core control and thread memory 615 and data buffers 715. When the programmable atomic operations circuitry 135 is embodied as a processor 110A or an HTP 115, the processor 110A or HTP 115 further comprises a network communication interface 170, as previously described, for communication over the communication network 150. The control logic and thread selection circuitry 630 comprises circuitry formed using combinations of any of a plurality of various logic gates (e.g., NAND, NOR, AND, OR, EXCLUSIVE OR, etc.) and various state machine circuits (control logic circuit(s) 631, thread selection control circuitry 705), and multiplexers (e.g., input multiplexer 687, thread selection multiplexer 685), for example and without limitation. The network communication interface 170 includes input queues 205 to receive data packets from the communication network 150; output queues 210 to transfer data packets (including response packets) to the communication network 150; a data packet decoder circuit 215 to decode incoming data packets from the communication network 150, take data (in designated fields) and transfer the data provided in the packet to the relevant registers of the core control and thread memory 615; and data packet encoder circuit 220 to encode outgoing data packets (such as programmable atomic memory operation response packets, requests to the first memory circuit 125) for transmission on the communication network 150. The data packet decoder circuit 215 and the data packet encoder circuit 220 may each be implemented as state machines or other logic circuitry. Depending upon the selected embodiment, there may be separate core control circuitry 610 and separate core control and thread memory 615 for each processor core 605, or single core control circuitry 610 and single core control and thread memory 615 may be utilized for multiple processor cores 605.

The programmable atomic operation request and read data, as discussed above, is provided to the memory controller interface circuit 720 from the request selection multiplexer 305 and the data selection multiplexer 310, respectively, using communication bus or line 60, 60A. The request includes information on the source of the request (e.g., a source address), and an atomic memory operator identifier, which is a designation of the specific programmable atomic operation to be performed. Collectively, the source address, the atomic memory operator identifier, and the read data (as operand data) comprise a "work descriptor".

The programmable atomic operations allow the system 50, 50A user to define a set of atomic memory operations that are specific to a set of target applications. These programmable atomic operations comprise program instructions stored in the instruction cache 640 for execution by the processor core 605. In a representative embodiment, the memory controller interface circuit 720 includes a set of registers 710 containing a translation table that translates the atomic memory operator identifier to a (virtual) instruction address, for selection of the instruction to begin execution of the programmable atomic operation by the processor core 605. In another representative embodiment, the core control and thread memory 615 includes the set of registers 710 containing a translation table that translates the atomic memory operator identifier to a (virtual) instruction address, for selection of the instruction to begin execution of the programmable atomic operation by the processor core 605.

When a work descriptor arrives through the memory controller interface circuit 720, the control logic and thread selection circuitry 630 assigns an available thread identifier (ID) to the thread of the word descriptor, from thread ID pool registers (not separately illustrated), with the assigned thread ID used as an index to the other registers of the core control and thread memory 615 which are then populated with corresponding data from the work descriptor, and typically the program count and one or more arguments. The control logic and thread selection circuitry 630 initializes the remainder of the thread context state autonomously in preparation for starting the thread executing instructions for the programmable atomic operation, such as loading the data buffers 715, as needed. The data buffers 715 are utilized to minimize requests (such as requests to first memory circuit 125) by storing read request data and write data, pre-fetched data, and any interim results which may be generated during execution of the programmable atomic operation.

That thread ID is given a valid status (indicating it is ready to execute), and the thread ID is pushed to the first priority queue 655 of the execution (ready-to-run) queue(s) 645, as threads for the programmable atomic operations are typically assigned the highest (first) priority available. If the programmable atomic operations circuitry 135 is embodied as an HTP 115 which may also be performing other operations, a dedicated queue for thread IDs for programmable atomic operations is provided, which again has the highest priority for rapid selection and execution. Selection circuitry of the control logic and thread selection circuitry 630, such as a multiplexer 685, selects the next thread ID in the execution (ready-to-run) queue(s) 645, which is used as in index into the core control and thread memory 615 (the program count registers and thread state registers), to select the instruction from the instruction cache 640 which is then provided to the execution pipeline 650 for execution. The execution pipeline then executes that instruction for the programmable atomic operation.

At completion of execution of the instruction, under the control of the control logic and thread selection circuitry 630 the same triplet of information (thread ID, valid state, and priority) can be returned to the first priority queue 655 of the execution (ready-to-run) queue(s) 645, for continued selection for execution, to continue executing instructions for the programmable atomic operation, depending upon various conditions. For example, if the last instruction for a selected thread ID was a return instruction (indicating that thread execution for the programmable atomic operation was completed and resulting atomic operation data is being provided), the control logic and thread selection circuitry 630 will return the thread ID to the available pool of thread IDs in the thread ID pool registers, to be available for use by another, different thread. Also for example, the valid indicator could change, such as changing to a pause state (such as while the thread may be waiting for information to be returned from or written to first memory circuit 125 or waiting for another event), and in which case, the thread ID (now having a pause status) is not returned to the execution (ready-to-run) queue(s) 745 until the status changes back to valid or a predetermined amount of time has elapsed (to avoid stalling or halting the programmable atomic operations circuitry 135 if the instructions provided by the user for the programmable atomic operation are problematic in any way).

Continuing with the former example, when the last instruction for a selected thread ID was a return instruction, the return information (thread ID and return arguments) is then pushed by the execution pipeline 650 to the network command queue 690, which is typically implemented as first-in, first out (FIFO). The thread ID is used as an index into the thread return registers to obtain the return information, such as the transaction ID and the source (caller) address (or other identifier), and the packet encoder circuit (in the network communication interface 170 of the first memory controller circuit 100 or in the network communication interface 170 of the processor 110A) then generates an outgoing return data packet (on the communication network 150). In addition, as discussed above, the resulting data is provided to the memory controller interface circuit 720, for the resulting data to be written to the second memory circuit 175.

The set of programmable atomic operations supported by the system 50, 50A (and corresponding instructions) are established at boot time. The table in the registers 710 that translates the atomic memory operator identifier to a (virtual) instruction address is loaded by the operating system.

Various constraints may also be placed upon the programmable atomic operations, such as limiting the corresponding write address space to areas of memory for which the given programmable atomic operation has write privileges, and limiting the number of instruction which may be executed in the programmable atomic operation, to ensure that the programmable atomic operation completes (and the hazard bit is subsequently cleared or reset when the resulting data is written to the second memory circuit 175). In addition, the hazard bit may be subsequently cleared or reset automatically after a predetermined period of time, to not allow the programmable atomic operation to reserve a cache line in the second memory circuit 175 indefinitely.

For example, the incoming work descriptor is also utilized to initialize a new thread (for the programmable atomic operation) in thread registers in the core control and thread memory 615, such as with information shown in Table 5, for example.

TABLE 5

| Item Name | RISC-V (Core 605) Register | Item Description |
|---|---|---|
| Atomic Request Address | A0 | Address sent in programmable (custom) atomic request |
| Memory Data | A1 | Data obtained by accessing memory using |

TABLE 5-continued

| Item Name | RISC-V (Core 605) Register | Item Description |
|---|---|---|
| (8-Bytes) | | programmable (custom) atomic request address |
| Atomic Request Argument #1 | A2 | Optional programmable (custom) atomic request argument. Up to four arguments can be included in the atomic request packet transmitted over the communication network 150. |
| Atomic Request Argument #2 | A3 | Optional programmable (custom) atomic request argument. |
| Atomic Request Argument #3 | A4 | Optional programmable (custom) atomic request argument. |
| Atomic Request Argument #4 | A5 | Optional programmable (custom) atomic request argument. |

Continuing with the example, the created thread executes standard and custom RISC-V instructions to perform the programmable (custom) atomic operation. For a fetch-and-operation command, the RISC-V instructions would perform the defined operation on A1 and A2, writing the result to the address provided in A0. The address in A0 would also be used for clearing the memory line hazard lock.

New RISC-V instructions have been invented to support programmable atomic operations.

A load non-buffered instruction (Load Non-Buffered (NB)) checks for a buffer hit in data buffers 715, but on a buffer miss will issue a memory request for just the requested operand and not put the obtained data in a buffer. Instructions of this type have an NB suffix (non-buffered).

LB.NB RA,40(SP)

The NB load instructions are expected to be used in runtime libraries written in assembly. Example load instructions are listed in Table 6, which shows a Load Non-Buffered Instruction Format.

TABLE 6

| 31 20 | 19 15 | 14 12 | 11 7 | 6 0 | |
|---|---|---|---|---|---|
| Imm[11:0] | rs1 | 000 | rd | 0000010 | LB.NB |
| Imm[11:0] | rs1 | 001 | rd | 0000010 | LH.NB |
| Imm[11:0] | rs1 | 010 | rd | 0000010 | LW.NB |
| Imm[11:0] | rs1 | 011 | rd | 0000010 | LD.NB |
| Imm[11:0] | rs1 | 100 | rd | 0000010 | LBU.NB |
| Imm[11:0] | rs1 | 101 | rd | 0000010 | LHU.NB |
| Imm[11:0] | rs1 | 110 | rd | 0000010 | LWU.NB |
| Imm[11:0] | rs1 | 010 | rd | 0000110 | FLW.NB |
| Imm[11:0] | rs1 | 011 | rd | 0000110 | FLD.NB |

Programmable (custom) atomic operations set a hazard bit (as a "lock") on the cache line of the second memory circuit 175 (as the provided address) when an atomic operation is received by the first or second memory controller circuit 100, 100A. The programmable atomic operations circuitry 135 indicates when the lock should be cleared. This should occur on the last store operation that the programmable atomic operations circuitry 135 performs for the programmable (custom) atomic operation (or on an atomic return instruction if no store is required). The programmable atomic operations circuitry 135 indicates that the hazard bit is to be cleared or reset by executing a hazard clear store operation.

The store instructions that indicate the hazard bit is to be cleared or reset are:

SB.CL          RA, 40(SP)
SH.CL          RA, 40(SP)

-continued

| | |
|---|---|
| SW.CL | RA, 40(SP) |
| SD.CL | RA, 40(SP) |
| FSW.CL | RA, 40(SP) |
| FSD.CL | RA, 40(SP) |

The format for these store instructions is shown in Table 7, which shows Store and Clear Lock Instruction Formats.

TABLE 7

| 31 25 | 24 20 | 19 15 | 14 12 | 11 7 | 6 0 | |
|---|---|---|---|---|---|---|
| Imm[11:5] | rs2 | rs1 | 000 | Imm[4:0] | 0110010 | SB.CL |
| Imm[11:5] | rs2 | rs1 | 001 | Imm[4:0] | 0110010 | SH.CL |
| Imm[11:5] | rs2 | rs1 | 010 | Imm[4:0] | 0110010 | SW.CL |
| Imm[11:5] | rs2 | rs1 | 011 | Imm[4:0] | 0110010 | SD.CL |
| Imm[11:5] | rs2 | rs1 | 010 | Imm[4:0] | 0110110 | FSW.CL |
| Imm[11:5] | rs2 | rs1 | 011 | Imm[4:0] | 0110110 | FSD.CL |

The Atomic Return (AR) instruction (AR) is used to complete the executing thread of a programmable atomic operation, optionally clear the hazard bit (lock), and optionally provide a response back to the source that issued the programmable atomic operation.

The AR instruction can send zero, one, or two 8-byte argument values back to the issuing compute element. The number of arguments to send back is determined by the ac2 suffix (A1 or A2). No suffix means zero arguments, A1 implies a single 8-byte argument, and A2 implies two 8-byte arguments. The arguments, if needed, are obtained from RISC-V X registers a1 and a2.

The AR instruction is also able to clear the hazard bit previously set for the cache line of the second memory circuit 175 (as the provided address) associated with the atomic instruction. The AR uses the value in the a0 register as the address to send the clear lock operation. The clear lock operation is issued if the instruction contains the suffix CL. The clear lock operation uses the value in register A0 as the address to be used to clear the lock.

The AR instruction has two variants, depending on whether the hazard bit lock associated with the atomic operation is to be cleared or not. The proposed instructions are shown in Table 8, which is a diagram illustrating Atomic Return Instruction Formats.

TABLE 8

| 31 25 | 24 20 | 19 15 | 14 12 | 11 7 | 6 0 | |
|---|---|---|---|---|---|---|
| 1010000 | 00000 | 00000 | ac2 | 00000 | 1110010 | AR |
| 1011000 | 00000 | 00000 | ac2 | 00000 | 1110010 | AR.CL |

Table 9 shows the AC2 suffix options for the Atomic Return instruction.

TABLE 9

| ac2 Encoding | Suffix | Argument Count |
|---|---|---|
| 0 | No suffix | 0 |
| 1 | A1 | 1 |
| 2 | A2 | 2 |

The following Example 1 shows an atomic fetch and XOR operation implemented as a programmable (custom) atomic operation.

Example 1

```
// a0-atomic address
// a1-64-bit memory value of (a0)
// a2-64-bit atomic operand
```

-continued

```
fetch_and_xor:
    xor.d    a2, a1, a2    // a1 contains memory value, a2
                           contains value to be XOR'ed in
    sd.cl    a2, 0(a0)     // a0 contains memory address,
                           clear hazard bit lock
    ar                     // evict line from buffer,
                           terminate atomic thread
```

The first instruction, xor.d, performs the XOR operation on the atomic operand and accessed memory values. The second instruction, sd.cl, stores the 64-bit value in register a2 to the atomic operation address provided in register a0. Additionally, the store operation is used to clear the hazard bit previously set for the cache line of the second memory circuit 175 (as the provided address). The last instruction, ar, causes the thread to be terminated. It should be noted that the sd.cl instruction stores the 64-bit value to a thread write buffer but does not force the write buffer to memory. The ar instruction is used to force all dirty write buffers to memory. This implies that the sd.cl instruction writes its 64-bit value to a write buffer, then marks the write buffer as needing to clear the associated hazard hazard when it is written to the second memory circuit 175 by the ar instruction.

The following Example 2 shows a Double Compare and Swap (DCAS) operation implemented as a programmable atomic operation.

Example 2

```
// a0-atomic address
// a1-64-bit memory value of (a0)
// a2-DCAS compare value 1
// a3-DCAS compare value 2
// a4-DCAS swap value 1
// a5-DCAS swap value 2
```

```
atomic_dcas:
        bne     a1, a2, fail    // first 8-byte compare
        ld.nb   a6, 8(a0)       // load second 8-byte
                                memory value-
                                should hit memory cache
        bne     a6, a3, fail    // second 8-byte compare
        sd      a4, 0(a0)       // store first 8-byte swap
                                value to thread store buffer
        sd.cl   a5, 8(a0)       // store second 8-byte value
                                and clear hazard bit
        li      a1, 0
        ar.a1                   // AMO success response
fail:
        li      a1, 1
        ar.a1.cl                // AMO failure response
                                (and clear hazard bit)
```

Example 2 shows the use of the non-buffered load instruction, ld.nb. The non-buffered load is used to pull in from memory just the required 8-bytes. Using the non-buffered load avoids prefetching the full memory buffer (e.g., 64-bytes).

Example 2 also shows the use of a sequence of store instructions, sd and sd.cl. The first instruction sd writes 64-bits to a write buffer. The second instruction, sd.cl, writes a second 64-bit value to the write buffer. The ar instruction writes the 16-bytes of dirty data in the write buffer back to memory as a single request, tagged with the need to clear the hazard bit.

This implementation of the DCAS returns a single value indicating success or failure. The second ar instruction is used to clear the hazard bit since no previous store performed the operation.

As mentioned above, the representative apparatus, system and method provide for a memory controller 100, 100A which has high performance and is energy efficient. Representative embodiments of the memory controller 100, 100A provide support for compute intensive kernels or operations which require considerable and highly frequent memory accesses, such as for performing Fast Fourier Transform ("FFT") operations, finite impulse response ("FIR") filtering, and other compute intensive operations typically used in larger applications such as synthetic aperture radar, 5G networking and 5G base station operations, machine learning, AI, stencil code operations, and graph analytic operations such as graph clustering using spectral techniques, for example and without limitation. Representative embodiments of the memory controller 100, 100A are optimized for high throughput and low latency, including high throughput and low latency for atomic operations, including a wide range of atomic operations, both predetermined atomic operations and also programmable or user-defined atomic operations.

Representative embodiments of the memory controller 100, 100A produced dramatic results compared to a state-of-the-art X86 server platform. For example, representative embodiments of the memory controller 100, 100A provided over a three-fold (3.48×) better atomic update performance using a standard GDDR6 DRAM memory, and provided a seventeen-fold (17.6×) better atomic update performance using a modified GDDR6 DRAM memory (having more memory banks.

The representative embodiments of the memory controller 100, 100A also provided for very low latency and high throughput memory read and write operations, generally only limited by the memory bank availability, error correction overhead, and the bandwidth (Gb/s) available over communication network 150 and the memory 125, 175 devices themselves, resulting in a flat latency until maximum bandwidth is achieved.

Representative embodiments of the memory controller 100, 100A also provide very high performance (high throughput and low latency) for programmable or user-defined atomic operations, comparable to the performance of predetermined atomic operations. Additional, direct data paths provided for the programmable atomic operations circuitry 135 executing the programmable or user-defined atomic operations allow for additional write operations without any limitations imposed by the bandwidth of the communication network 150 and without increasing any congestion of the communication network 150.

As used herein, a "processor core" 605 may be any type of processor core, and may be embodied as one or more processor cores configured, designed, programmed or otherwise adapted to perform the functionality discussed herein. As used herein, a "processor" 110, 110A may be any type of processor, and may be embodied as one or more processors configured, designed, programmed or otherwise adapted to perform the functionality discussed herein. As the term processor is used herein, a processor 110, 110A may include use of a single integrated circuit ("IC"), or may include use of a plurality of integrated circuits or other components connected, arranged or grouped together, such as controllers, microprocessors, digital signal processors ("DSPs"), array processors, graphics or image processors, parallel processors, multiple core processors, custom ICs, application specific integrated circuits ("ASICs"), field programmable gate arrays ("FPGAs"), adaptive computing ICs, associated memory (such as RAM, DRAM and ROM), and other ICs and components, whether analog or digital. As a consequence, as used herein, the term processor or controller should be understood to equivalently mean and include a single IC, or arrangement of custom ICs, ASICs, processors, microprocessors, controllers, FPGAs, adaptive computing ICs, or some other grouping of integrated circuits which perform the functions discussed herein, with associated memory, such as microprocessor memory or additional RAM, DRAM, SDRAM, SRAM, MRAM, ROM, FLASH, EPROM or $E^2$PROM. A processor 110, 110A, with associated memory, may be adapted or configured (via programming, FPGA interconnection, or hard-wiring) to perform the methodology of the invention, as discussed herein. For example, the methodology may be programmed and stored, in a processor 110, 110A with its associated memory (and/or memory 125) and other equivalent components, as a set of program instructions or other code (or equivalent configuration or other program) for subsequent execution when the processor 110, 110A is operative (i.e., powered on and functioning). Equivalently, when the processor 110, 110A may implemented in whole or part as FPGAs, custom ICs and/or ASICs, the FPGAs, custom ICs or ASICs also may be designed, configured and/or hard-wired to implement the methodology of the invention. For example, the processor 110, 110A may be implemented as an arrangement of analog and/or digital circuits, controllers, microprocessors, DSPs and/or ASICs, collectively referred to as a "processor" or "controller", which are respectively hard-wired, programmed, designed, adapted or configured to implement the methodology of the invention, including possibly in conjunction with a memory 125.

The first memory circuit 125 and the second memory circuit 175, which may include a data repository (or database), may be embodied in any number of forms, including within any computer or other machine-readable data storage medium, memory device or other storage or communication device for storage or communication of information, currently known or which becomes available in the future, including, but not limited to, a memory integrated circuit ("IC"), or memory portion of an integrated circuit (such as the resident memory within a processor 110, 110A or processor IC), whether volatile or non-volatile, whether removable or non-removable, including without limitation RAM, FLASH, DRAM, SDRAM, SRAM, MRAM, FeRAM, ROM, EPROM or $E^2PROM$, or any other form of memory device, such as a magnetic hard drive, an optical drive, a magnetic disk or tape drive, a hard disk drive, other machine-readable storage or memory media such as a floppy disk, a CDROM, a CD-RW, digital versatile disk (DVD) or other optical memory, or any other type of memory, storage medium, or data storage apparatus or circuit, which is known or which becomes known, depending upon the selected embodiment. The memory 125, 175 may be adapted to store various look up tables, parameters, coefficients, other information and data, programs or instructions (of the software of the present invention), and other types of tables such as database tables.

As indicated above, the processor 110, 110A is hard-wired or programmed, using software and data structures of the invention, for example, to perform the methodology of the present invention. As a consequence, the system and related methods of the present invention, including the various instructions, may be embodied as software which provides such programming or other instructions, such as a set of instructions and/or metadata embodied within a non-transitory computer readable medium, discussed above. In addition, metadata may also be utilized to define the various data structures of a look up table or a database. Such software may be in the form of source or object code, by way of example and without limitation. Source code further may be compiled into some form of instructions or object code (including assembly language instructions or configuration information). The software, source code or metadata of the present invention may be embodied as any type of code, such as C, C++, Matlab, SystemC, LISA, XML, Java, Brew, SQL and its variations (e.g., SQL 99 or proprietary versions of SQL), DB2, Oracle, or any other type of programming language which performs the functionality discussed herein, including various hardware definition or hardware modeling languages (e.g., Verilog, VHDL, RTL) and resulting database files (e.g., GDSII). As a consequence, a "construct", "program construct", "software construct" or "software", as used equivalently herein, means and refers to any programming language, of any kind, with any syntax or signatures, which provides or can be interpreted to provide the associated functionality or methodology specified (when instantiated or loaded into a processor or computer and executed, including the processor 110, 110A, for example).

The software, metadata, or other source code of the present invention and any resulting bit file (object code, database, or look up table) may be embodied within any tangible, non-transitory storage medium, such as any of the computer or other machine-readable data storage media, as computer-readable instructions, data structures, program modules or other data, such as discussed above with respect to the memory 125, e.g., a floppy disk, a CDROM, a CD-RW, a DVD, a magnetic hard drive, an optical drive, or any other type of data storage apparatus or medium, as mentioned above.

The communication interface(s) 130 are utilized for appropriate connection to a relevant channel, network or bus; for example, the communication interface(s) 130 may provide impedance matching, drivers and other functions for a wireline or wireless interface, may provide demodulation and analog to digital conversion for a wireless interface, and may provide a physical interface, respectively, for the processor 110, 110A and/or memory 125, with other devices. In general, the communication interface(s) 130 are used to receive and transmit data, depending upon the selected embodiment, such as program instructions, parameters, configuration information, control messages, data and other pertinent information.

The communication interface(s) 130 may be implemented as known or may become known in the art, to provide data communication between the system 50, 50A and any type of network or external device, such as wireless, optical, or wireline, and using any applicable standard (e.g., one of the various PCI, USB, RJ 45, Ethernet (Fast Ethernet, Gigabit Ethernet, 300ase-TX, 300ase-FX, etc.), IEEE 802.11, Bluetooth, WCDMA, WiFi, GSM, GPRS, EDGE, 3G and the other standards and systems mentioned above, for example and without limitation), and may include impedance matching capability, voltage translation for a low voltage processor to interface with a higher voltage control bus, wireline or wireless transceivers, and various switching mechanisms (e.g., transistors) to turn various lines or connectors on or off in response to signaling from processor 110, 110A. In addition, the communication interface(s) 130 may also be configured and/or adapted to receive and/or transmit signals externally to the system 50, 50A, such as through hardwiring or RF or infrared signaling, for example, to receive information in real-time for output on a display, for example. The communication interface(s) 130 may provide connection to any type of bus or network structure or medium, using any selected architecture. By way of example and without limitation, such architectures include Industry Standard Architecture (ISA) bus, Enhanced ISA (EISA) bus, Micro Channel Architecture (MCA) bus, Peripheral Component Interconnect (PCI) bus, SAN bus, or any other communication or signaling medium, such as Ethernet, ISDN, T1, satellite, wireless, and so on.

The present disclosure is to be considered as an exemplification of the principles of the invention and is not intended to limit the invention to the specific embodiments illustrated. In this respect, it is to be understood that the invention is not limited in its application to the details of construction and to the arrangements of components set forth above and below, illustrated in the drawings, or as described in the examples. Systems, methods and apparatuses consistent with the present invention are capable of other embodiments and of being practiced and carried out in various ways.

Although the invention has been described with respect to specific embodiments thereof, these embodiments are merely illustrative and not restrictive of the invention. In the description herein, numerous specific details are provided, such as examples of electronic components, electronic and structural connections, materials, and structural variations, to provide a thorough understanding of embodiments of the present invention. One skilled in the relevant art will recognize, however, that an embodiment of the invention can be practiced without one or more of the specific details, or with other apparatus, systems, assemblies, components, materials, parts, etc. In other instances, well-known structures, materials, or operations are not specifically shown or described in detail to avoid obscuring aspects of embodiments of the present invention. In addition, the various Figures are not drawn to scale and should not be regarded as limiting.

Reference throughout this specification to "one embodiment", "an embodiment", or a specific "embodiment" means that a particular feature, structure, or characteristic described in connection with the embodiment is included in at least one embodiment of the present invention and not necessarily in all embodiments, and further, are not necessarily referring to the same embodiment. Furthermore, the particular features, structures, or characteristics of any specific embodiment of the present invention may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated. In addition, every intervening subrange within range is contemplated, in any combination, and is within the scope of the disclosure. For example, for the range of 5-10, the sub-ranges 5-6, 5-7, 5-8, 5-9, 6-7, 6-8, 6-9, 6-10, 7-8, 7-9, 7-10, 8-9, 8-10, and 9-10 are contemplated and within the scope of the disclosed range.

It will also be appreciated that one or more of the elements depicted in the Figures can also be implemented in a more separate or integrated manner, or even removed or rendered inoperable in certain cases, as may be useful in accordance with a particular application. Integrally formed combinations of components are also within the scope of the invention, particularly for embodiments in which a separation or combination of discrete components is unclear or indiscernible. In addition, use of the term "coupled" herein, including in its various forms such as "coupling" or "couplable", means and includes any direct or indirect electrical, structural or magnetic coupling, connection or attachment, or adaptation or capability for such a direct or indirect electrical, structural or magnetic coupling, connection or attachment, including integrally formed components and components which are coupled via or through another component.

With respect to signals, we refer herein to parameters that "represent" a given metric or are "representative" of a given metric, where a metric is a measure of a state of at least part of the regulator or its inputs or outputs. A parameter is considered to represent a metric if it is related to the metric directly enough that regulating the parameter will satisfactorily regulate the metric. A parameter may be considered to be an acceptable representation of a metric if it represents a multiple or fraction of the metric.

Furthermore, any signal arrows in the drawings/Figures should be considered only exemplary, and not limiting, unless otherwise specifically noted. Combinations of components of steps will also be considered within the scope of the present invention, particularly where the ability to separate or combine is unclear or foreseeable. The disjunctive term "or", as used herein and throughout the claims that follow, is generally intended to mean "and/or", having both conjunctive and disjunctive meanings (and is not confined to an "exclusive or" meaning), unless otherwise indicated. As used in the description herein and throughout the claims that follow, "a", "an", and "the" include plural references unless the context clearly dictates otherwise. Also as used in the description herein and throughout the claims that follow, the meaning of "in" includes "in" and "on" unless the context clearly dictates otherwise.

The foregoing description of illustrated embodiments of the present invention, including what is described in the summary or in the abstract, is not intended to be exhaustive or to limit the invention to the precise forms disclosed herein. From the foregoing, it will be observed that numerous variations, modifications and substitutions are intended and may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

The invention claimed is:

1. A system coupleable to a first memory circuit, the system comprising:
a processor circuit comprising programmable atomic operations circuitry configured to perform at least one programmable atomic operation of a plurality of programmable atomic operations in response to an atomic operation request designating the at least one programmable atomic operation; and
a memory controller circuit coupled to the processor circuit, the memory controller circuit comprising:
a first memory control circuit coupleable to the first memory circuit, the first memory control circuit configured to read or load requested data from the first memory circuit in response to a read request and to write or store requested data to the first memory circuit in response to a write request;
a second memory circuit; and
a second memory control circuit coupled to the second memory circuit and to the first memory control circuit, the second memory control circuit configured, in response to the atomic operation request designating the at least one programmable atomic operation and a memory address, to read or load the requested data from the second memory circuit when the requested data is stored in the second memory circuit, to transfer the atomic operation request designating the at least one programmable atomic operation to the programmable atomic operations circuitry, to set a hazard bit stored in a memory hazard register corresponding to the memory address, and following receipt of data resulting from the at least one programmable atomic operation, to write the resulting data from the programmable atomic operation in the second memory circuit and reset or clear the set hazard bit.

2. The system of claim 1, wherein the atomic operation request designating the at least one programmable atomic operation comprises a physical memory address, a programmable atomic operations identifier, and at least one thread state register value.

3. The system of claim 2, wherein the programmable atomic operations circuitry further comprises:
at least one register configured to store thread state information.

4. The system of claim 3, wherein the programmable atomic operations circuitry is further configured, in response to receiving the atomic operation request designating the at least one programmable atomic operation, to initialize the at least one register with the physical memory address, any data corresponding to the memory address, and the at least one thread state register value.

5. The system of claim 1, wherein the memory controller circuit further comprises:
predetermined atomic operations circuitry configured to perform at least one predetermined atomic operation of a plurality of predetermined atomic operations in response to an atomic operation request designating the at least one predetermined atomic operation.

6. The system of claim 5, wherein the plurality of predetermined atomic operations comprises at least two predetermined atomic operations selected from the group consisting of: Fetch-and-AND, Fetch-and-OR, Fetch-and-XOR, Fetch-and-Add, Fetch-and-Subtract, Fetch-and-Increment, Fetch-and-Decrement, Fetch-and-Minimum, Fetch-and-Maximum, Fetch-and-Swap, Compare-and-Swap, and combinations thereof.

7. The system of claim 5, wherein the first memory control circuit, the second memory circuit, the second memory control circuit, the predetermined atomic operations circuitry, and the processor circuit are embodied as a single integrated circuit or as a single system-on-a-chip (SOC).

8. The system of claim 1, wherein the programmable atomic operations circuitry comprises:
an instruction cache configured to store a plurality of processor instructions corresponding to the at least one programmable atomic operation;
a core control circuit coupled to the instruction cache, the core control circuit configured to select a starting or next instruction or instruction address in the instruction cache for execution of the programmable atomic operation; and
a processor core configured to execute at least one instruction for the programmable atomic operation and to generate resulting data.

9. The system of claim 8, wherein the processor core is further configured to execute a store and clear lock instruction to generate an atomic write request to the second memory control circuit, the atomic write request having the resulting data and a designation to reset or clear a memory hazard bit following writing of the resulting data to the second memory circuit.

10. The system of claim 1, wherein the programmable atomic operations circuitry is further configured to perform at least one programmable atomic operation selected from the group consisting of: user-defined atomic operations, multi-cycle operations, floating point operations, multi-instruction operations, and combinations thereof.

11. The system of claim 1, wherein the first memory control circuit comprises:
a plurality of memory bank request queues configured to store a plurality of read or write requests to the first memory circuit;
a scheduler circuit coupled to the plurality of memory bank request queues, the scheduler configured to select a read or write request of the plurality of read or write requests from the plurality of memory bank request queues and to schedule the read or write request for access to the first memory circuit; and
a first memory access control circuit coupled to the scheduler, the first memory access control circuit configured to read or load data from the first memory circuit and to write or store data to the first memory circuit.

12. The system of claim 11, wherein the first memory control circuit further comprises:
a plurality of memory request queues configured to store a plurality of memory requests;
a request selection multiplexer configured to select a memory request from the plurality of memory request queues;
a plurality of memory data queues configured to store data corresponding to the plurality of memory requests; and
a data selection multiplexer configured to select data from the plurality of memory data queues, the selected data corresponding to the selected memory request.

13. The system of claim 1, wherein the second memory control circuit comprises:
a network request queue configured to store a read request or a write request;
an atomic operation request queue configured to store an atomic operation request;
an inbound request multiplexer coupled to the network request queue and to the atomic operation request queue, the inbound request multiplexer configured to select a request from the network request queue or the atomic operation request queue;
a memory hazard control circuit having one or more memory hazard registers; and
a second memory access control circuit coupled to the memory hazard control circuit and to the inbound request multiplexer, the second memory access control circuit configured to read or load data from the second memory circuit or to write or store data to the second memory circuit in response to the selected request, and to signal the memory hazard control circuit to set or clear a hazard bit stored in the one or more memory hazard registers.

14. The system of claim 13, wherein the second memory control circuit further comprises:
a delay circuit coupled to the second memory access control circuit; and
an inbound control multiplexer configured to select an inbound network request which requires accessing the first memory circuit or to select a cache eviction request from the second memory circuit when a cache line of the second memory circuit contains data which is to be written to the first memory circuit prior to being overwritten by data from a read request or a write request.

15. The system of claim 1, wherein the processor circuit is coupled to the first memory control circuit through an unswitched, direct communication bus.

16. A system coupleable to a first memory circuit, the system comprising:
a processor circuit comprising programmable atomic operations circuitry configured to perform at least one programmable atomic operation in response to an atomic operation request designating the at least one programmable atomic operation, the at least one programmable atomic operation selected from the group consisting of: user-defined atomic operations, multi-cycle operations, floating point operations, multi-instruction operations, arithmetic operations, logic operations, control flow decisions, and combinations thereof; and
a memory controller circuit coupled to the processor circuit, the memory controller circuit comprising:

a first memory control circuit coupleable to the first memory circuit, the first memory control circuit configured to read or load requested data from the first memory circuit in response to a read request and to write or store requested data to the first memory circuit in response to a write request;

a second memory circuit;

predetermined atomic operations circuitry configured to perform at least one predetermined atomic operation of a plurality of predetermined atomic operations in response to an atomic operation request designating the at least one predetermined atomic operation; and a second memory control circuit coupled to the second memory circuit and to the first memory control circuit, the second memory control circuit configured, in response to the atomic operation request designating the at least one programmable atomic operation and a memory address, to read or load the requested data from the second memory circuit when the requested data is stored in the second memory circuit, to transfer the atomic operation request designating the at least one programmable atomic operation to the first memory control circuit when the requested data is not stored in the second memory circuit, to transfer the atomic operation request designating the at least one programmable atomic operation to the programmable atomic operations circuitry, to set a hazard bit stored in a memory hazard register corresponding to the memory address, and following receipt of data resulting from the at least one programmable atomic operation, to write the resulting data from the programmable atomic operation in the second memory circuit and reset or clear the set hazard bit.

17. The system of claim 16, wherein the atomic operation request designating the at least one programmable atomic operation comprises a physical memory address, a programmable atomic operations identifier, and at least one thread state register value; wherein the programmable atomic operations circuitry further comprises:

at least one register configured to store thread state information; and wherein the programmable atomic operations circuitry is further configured, in response to receiving the atomic operation request designating the at least one programmable atomic operation, to initialize the at least one register with the physical memory address, any data corresponding to the memory address, and the at least one thread state register value.

18. The system of claim 16, wherein the programmable atomic operations circuitry comprises:

an instruction cache configured to store a plurality of processor instructions corresponding to the at least one programmable atomic operation;

a core control circuit coupled to the instruction cache, the core control circuit configured to select a starting or next instruction or instruction address in the instruction cache for execution of the programmable atomic operation; and a processor core configured to execute at least one instruction for the programmable atomic operation and to generate resulting data, the processor core further configured to execute a store and clear lock instruction to generate an atomic write request to the second memory control circuit, the atomic write request having the resulting data and a designation to reset or clear a memory hazard bit following writing of the resulting data to the second memory circuit.

19. The system of claim 16, wherein the first memory control circuit comprises:

a plurality of memory bank request queues configured to store a plurality of read or write requests to the first memory circuit;

a scheduler circuit coupled to the plurality of memory bank request queues, the scheduler circuit configured to select a read or write request of the plurality of read or write requests from the plurality of memory bank request queues and to schedule the read or write request for access to the first memory circuit;

a first memory access control circuit coupled to the scheduler circuit, the first memory access control circuit configured to read or load data from the first memory circuit and to write or store data to the first memory circuit;

a plurality of memory request queues configured to store a plurality of memory requests;

a request selection multiplexer configured to select a memory request from the plurality of memory request queues;

a plurality of memory data queues configured to store data corresponding to the plurality of memory requests; and a data selection multiplexer configured to select data from the plurality of memory data queues, the selected data corresponding to the selected memory request.

20. The system of claim 16, wherein the second memory control circuit comprises:

a network request queue configured to store a read request or a write request;

an atomic operation request queue configured to store an atomic operation request;

an inbound request multiplexer coupled to the network request queue and to the atomic operation request queue, the inbound request multiplexer configured to select a request from the network request queue or the atomic operation request queue;

a memory hazard control circuit having one or more memory hazard registers; and a second memory access control circuit coupled to the memory hazard control circuit and to the inbound request multiplexer, the second memory access control circuit configured to read or load data from the second memory circuit or to write or store data to the second memory circuit in response to the selected request, and to signal the memory hazard control circuit to set or clear a hazard bit stored in the one or more memory hazard registers.

21. A system coupleable to a first memory circuit, the system comprising:

a processor circuit comprising programmable atomic operations circuitry configured to perform at least one programmable atomic operation of a plurality of programmable atomic operations in response to an atomic operation request designating the at least one programmable atomic operation;

a unswitched, direct communication bus; and a memory controller circuit coupled to the processor circuit through the unswitched, direct communication bus, the memory controller circuit comprising:

a first memory control circuit coupleable to the first memory circuit, the first memory control circuit configured to read or load requested data from the first memory circuit in response to a read request and to write or store requested data to the first memory circuit in response to a write request;

a second memory circuit;

predetermined atomic operations circuitry configured to perform at least one predetermined atomic operation of a plurality of predetermined atomic operations in response to an atomic operation request designating the at least one predetermined atomic operation; and a second memory control circuit coupled to the second memory circuit and to the first memory control circuit, the second memory control circuit configured, in response to the atomic operation request designating the at least one programmable atomic operation and a memory address, to read or load the requested data from the second memory circuit when the requested data is stored in the second memory circuit, to transfer the atomic operation request designating the at least one programmable atomic operation to the programmable atomic operations circuitry, to set a hazard bit stored in a memory hazard register corresponding to the memory address, and following receipt of data resulting from the at least one programmable atomic operation, to write the resulting data from the programmable atomic operation in the second memory circuit and reset or clear the set hazard bit;

wherein the first memory control circuit, the second memory circuit, the second memory control circuit, the predetermined atomic operations circuitry, and the processor circuit are embodied as a single integrated circuit or as a single system-on-a-chip (SOC).

* * * * *